Nov. 6, 1934.  J. P. MELCHER ET AL  1,979,897
MACHINE FIXTURE
Original Filed Oct. 8, 1930  17 Sheets-Sheet 3
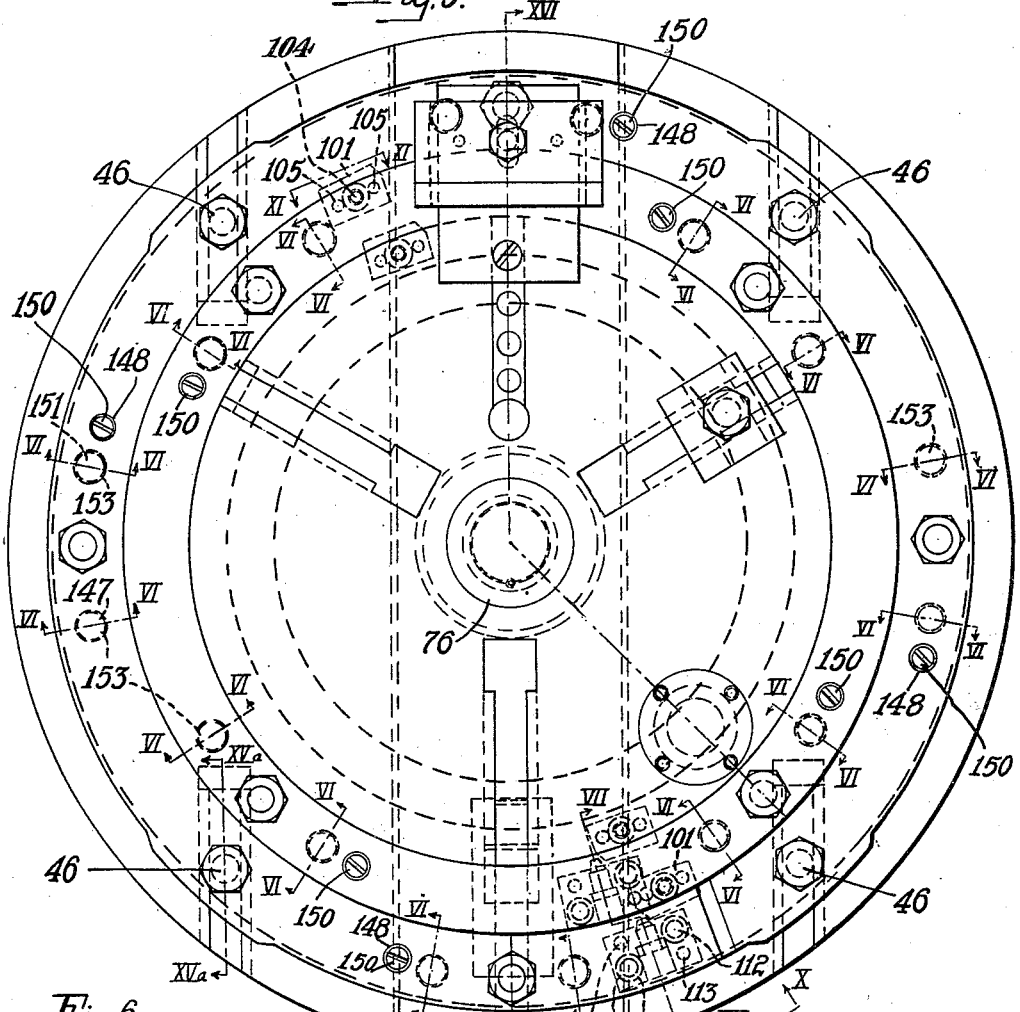
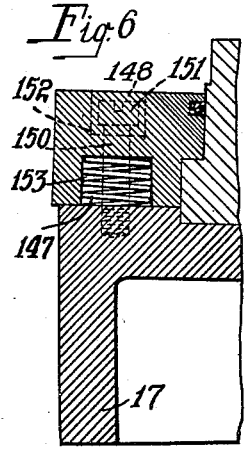
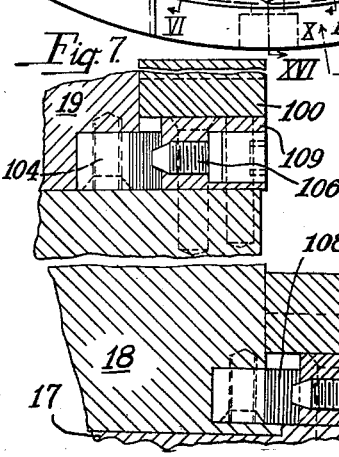
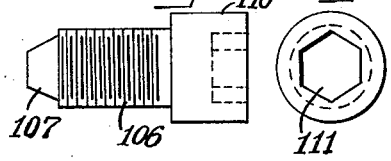

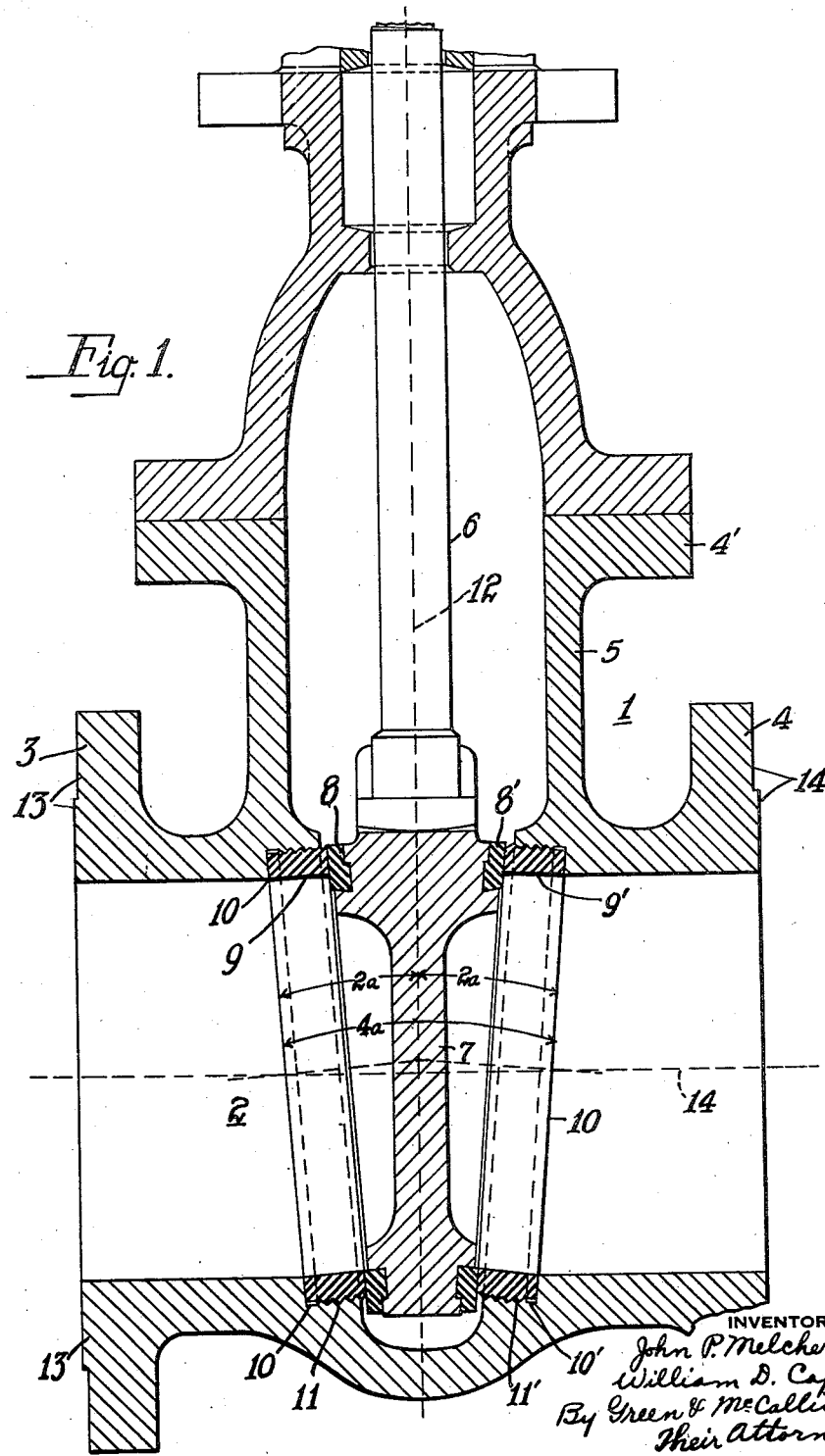

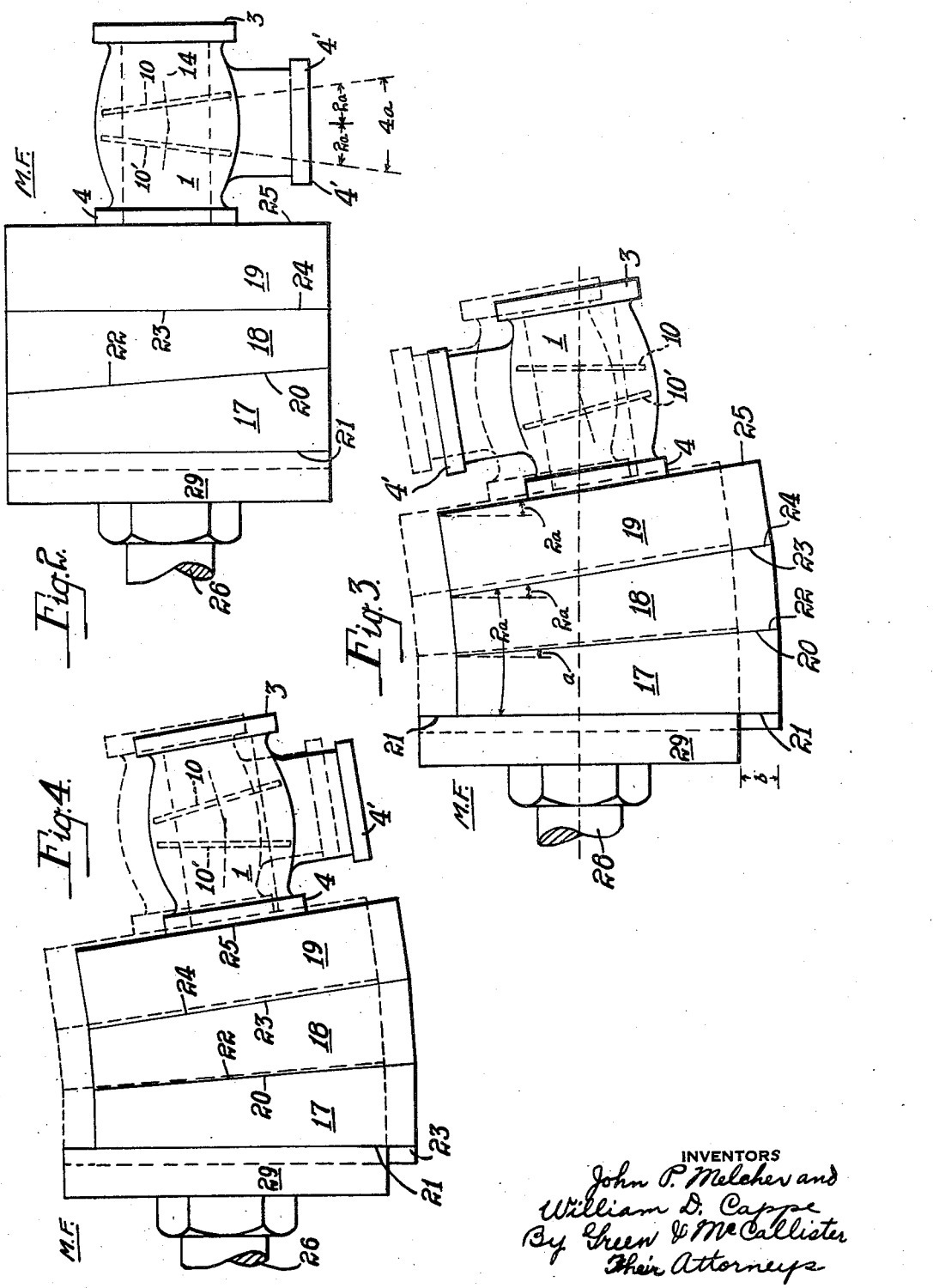

Nov. 6, 1934.    J. P. MELCHER ET AL    1,979,897
MACHINE FIXTURE
Original Filed Oct. 8, 1930    17 Sheets-Sheet 4
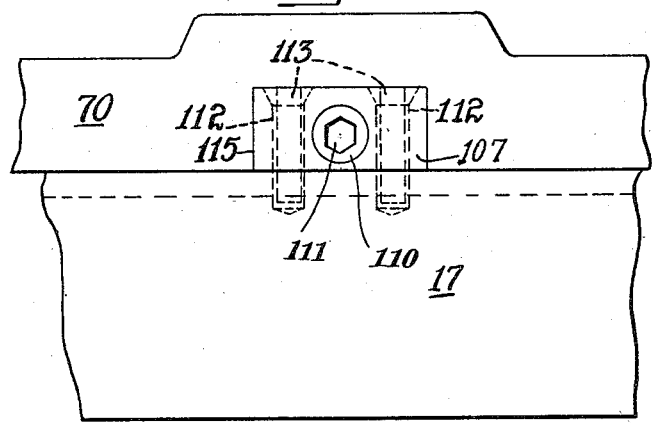
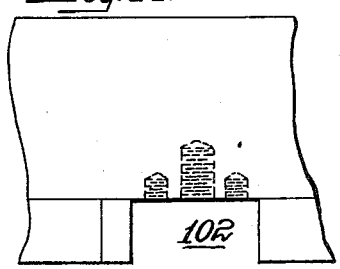
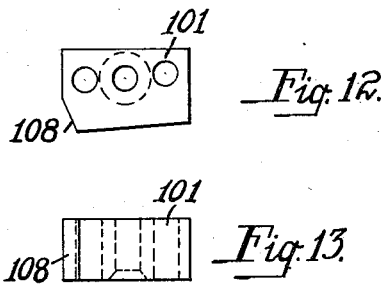
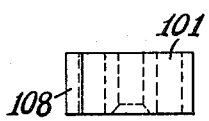
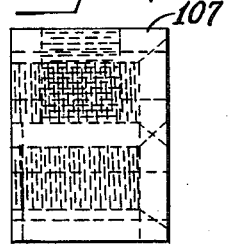
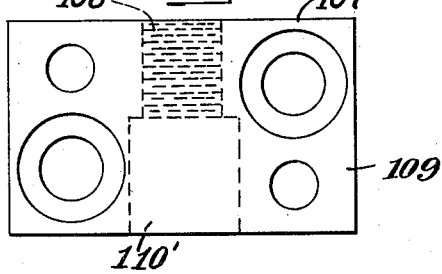
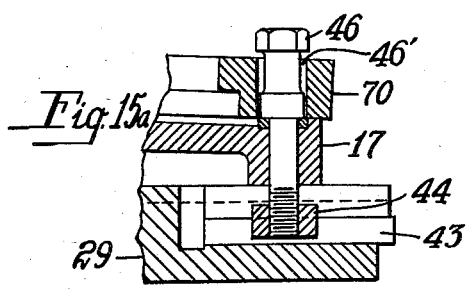
INVENTORS
John P. Melcher and
William D. Cappe
By Green & McCallister
Their Attorneys

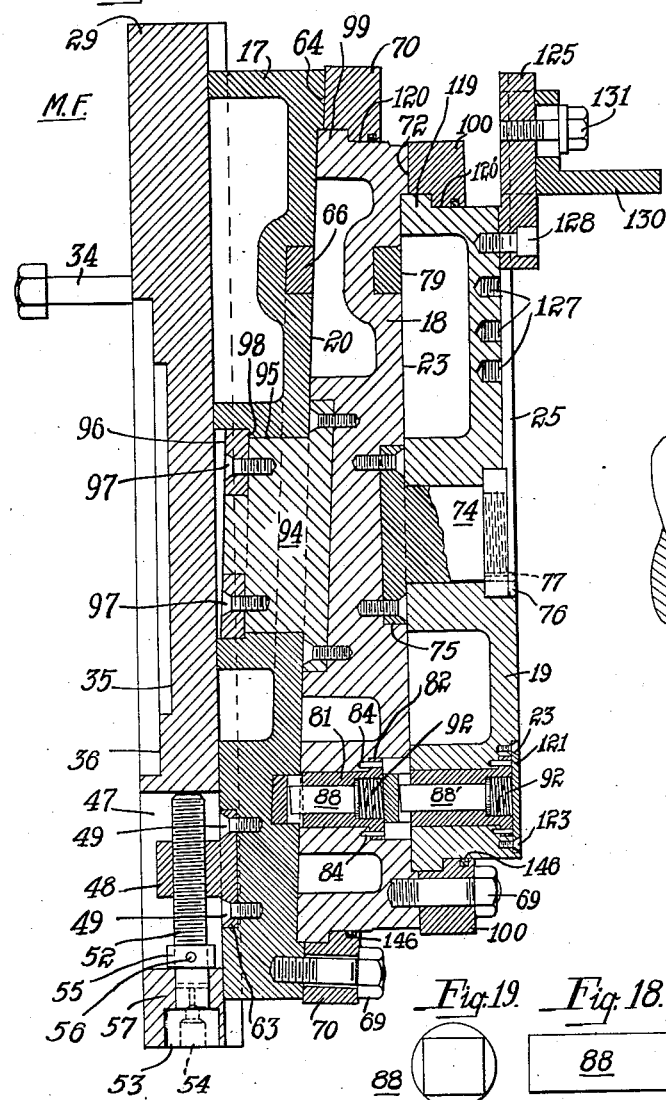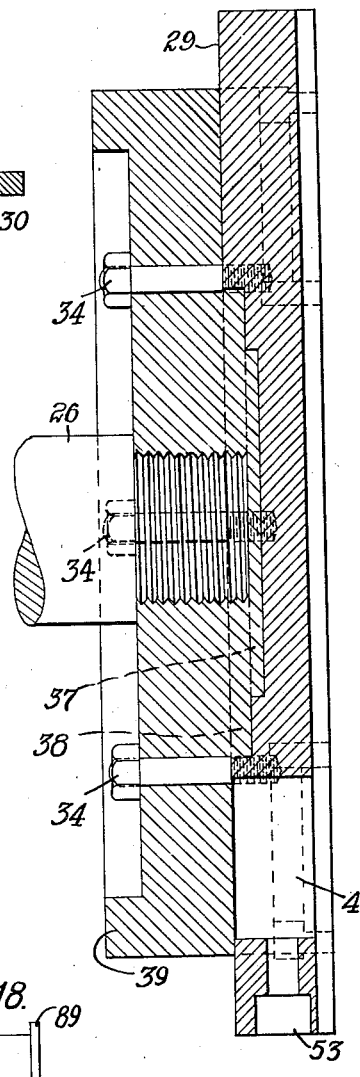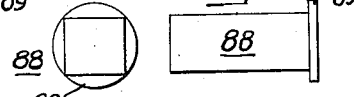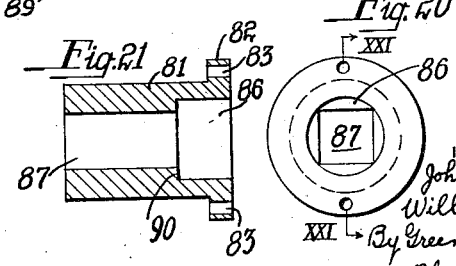

Nov. 6, 1934.    J. P. MELCHER ET AL    1,979,897
MACHINE FIXTURE
Original Filed Oct. 8, 1930    17 Sheets-Sheet 6
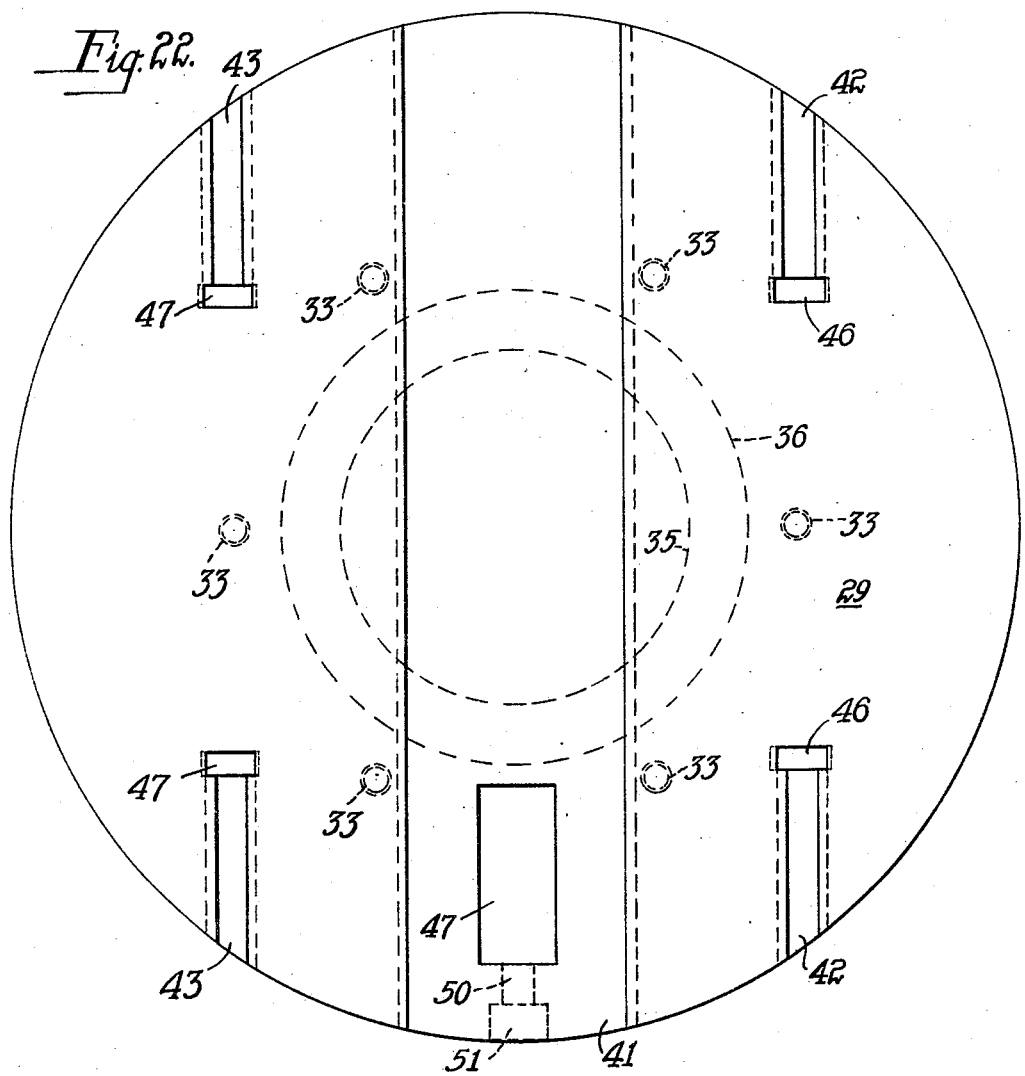
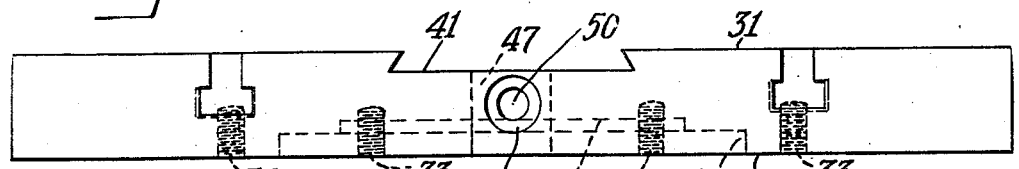
INVENTORS
John P. Melcher and
William D. Cappe
By Green & McCallister
Their Attorneys

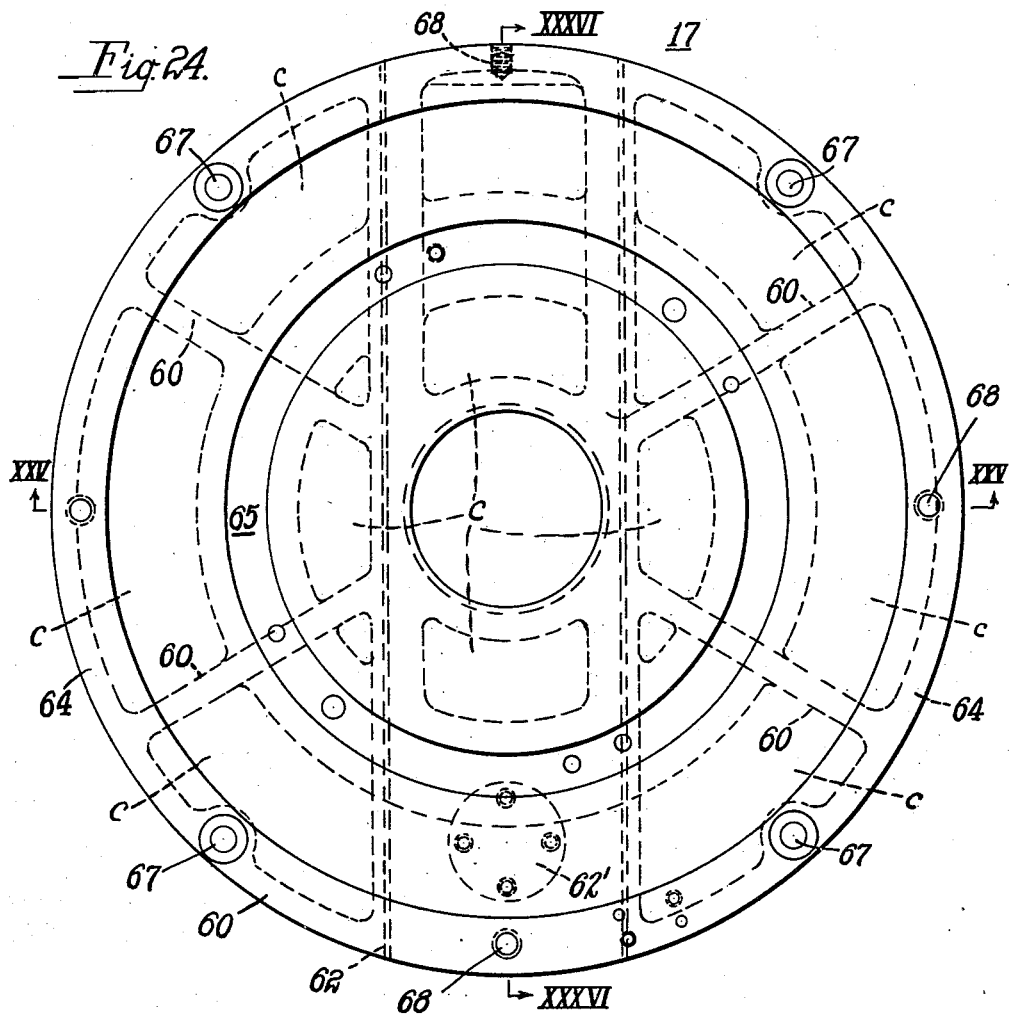
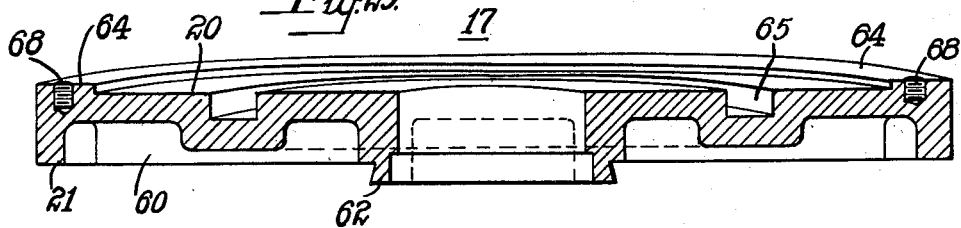

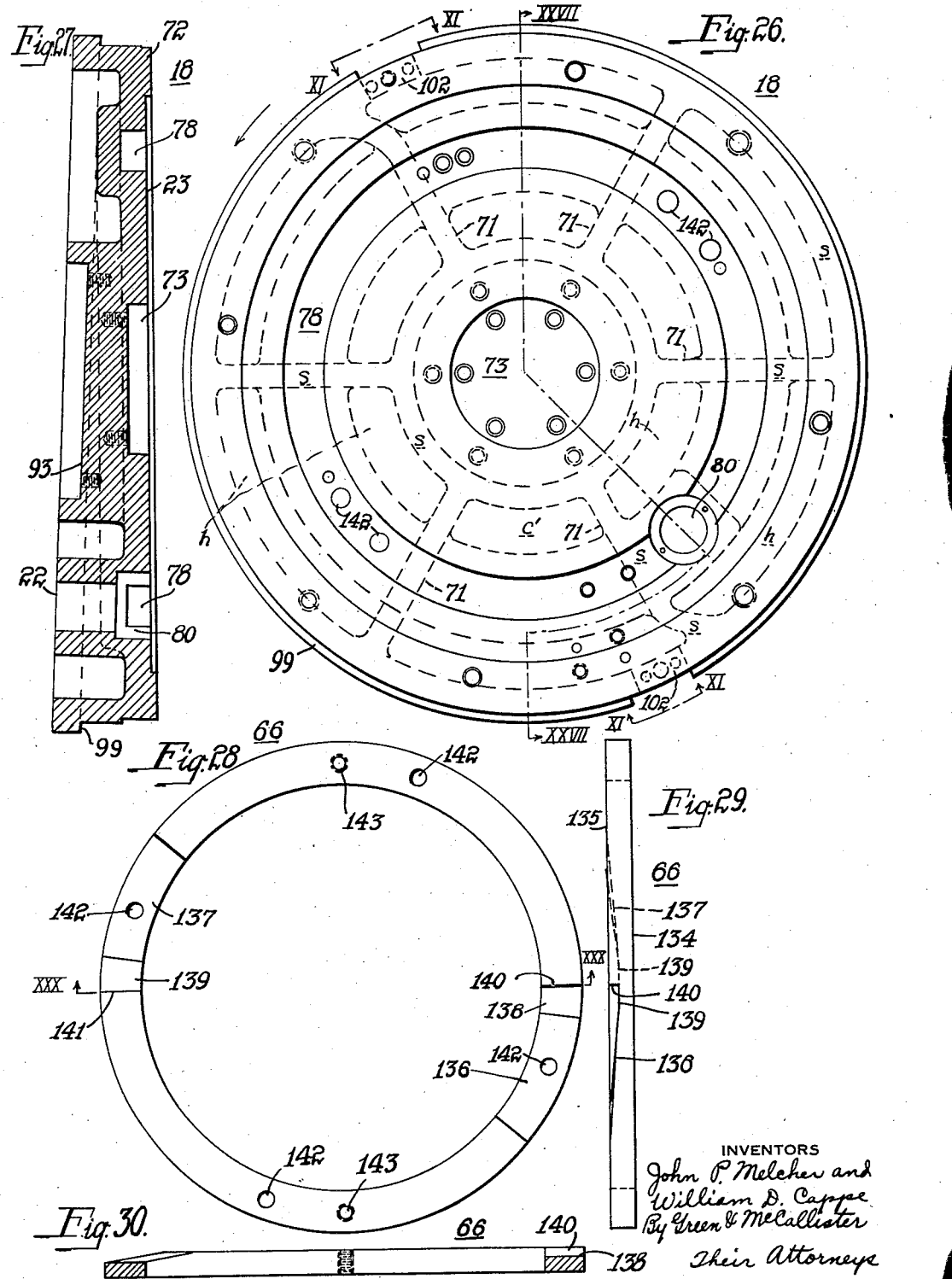

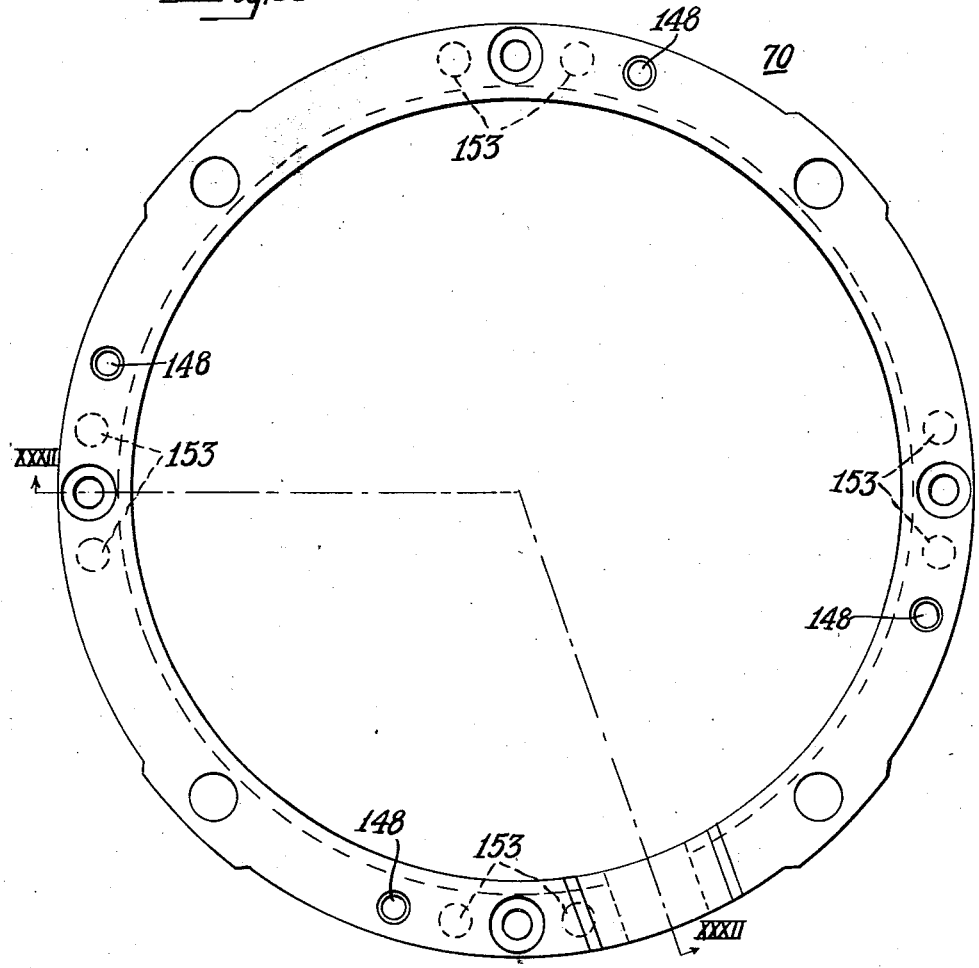
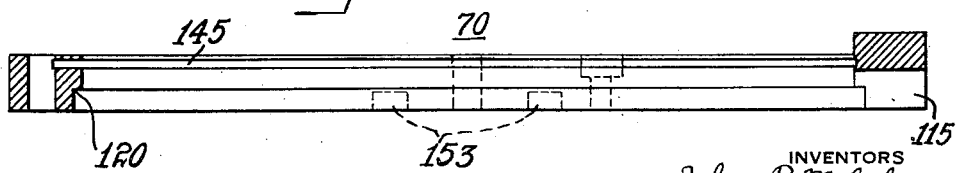

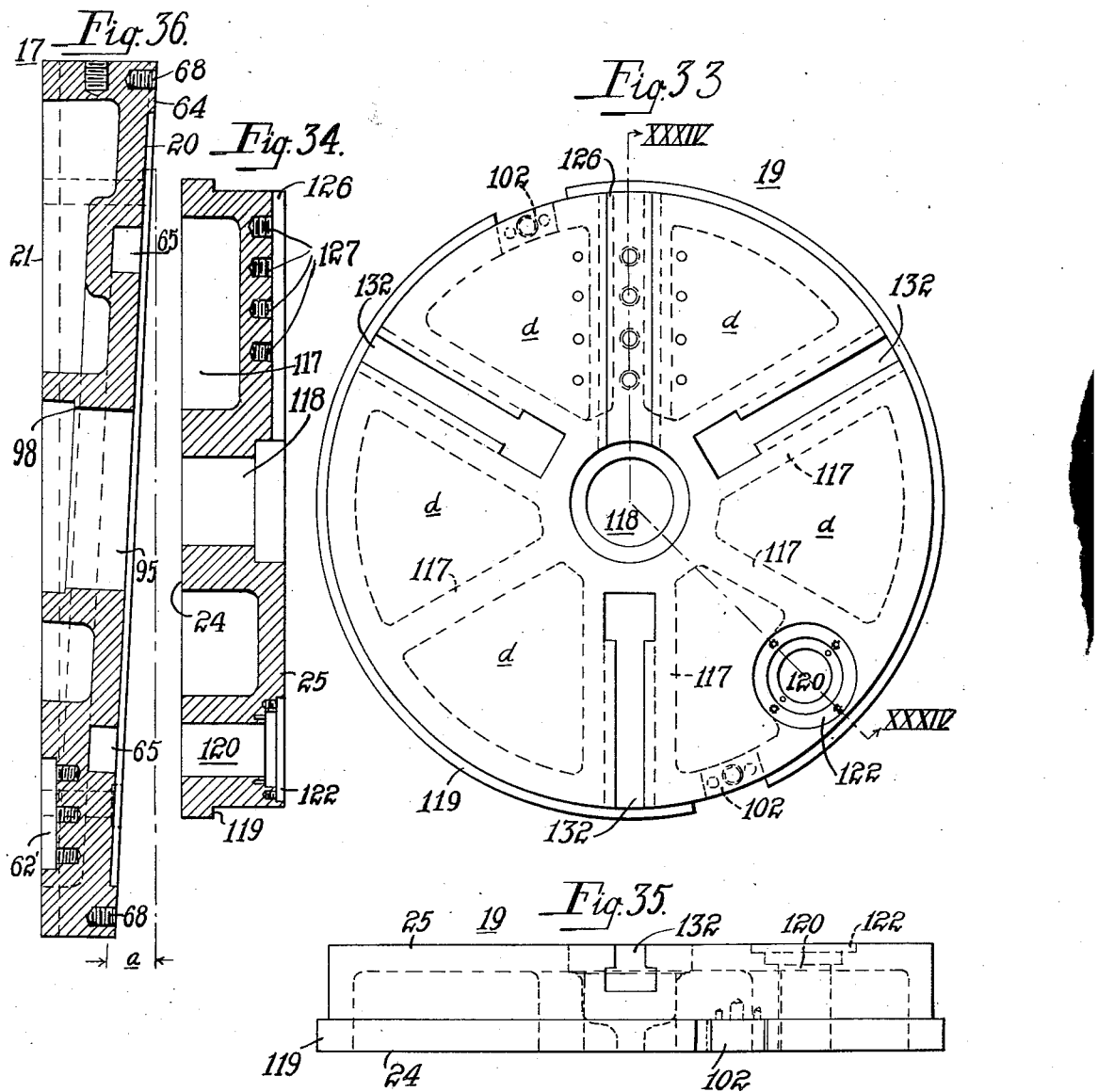

Nov. 6, 1934.    J. P. MELCHER ET AL    1,979,897
MACHINE FIXTURE
Original Filed Oct. 8, 1930    17 Sheets-Sheet 11
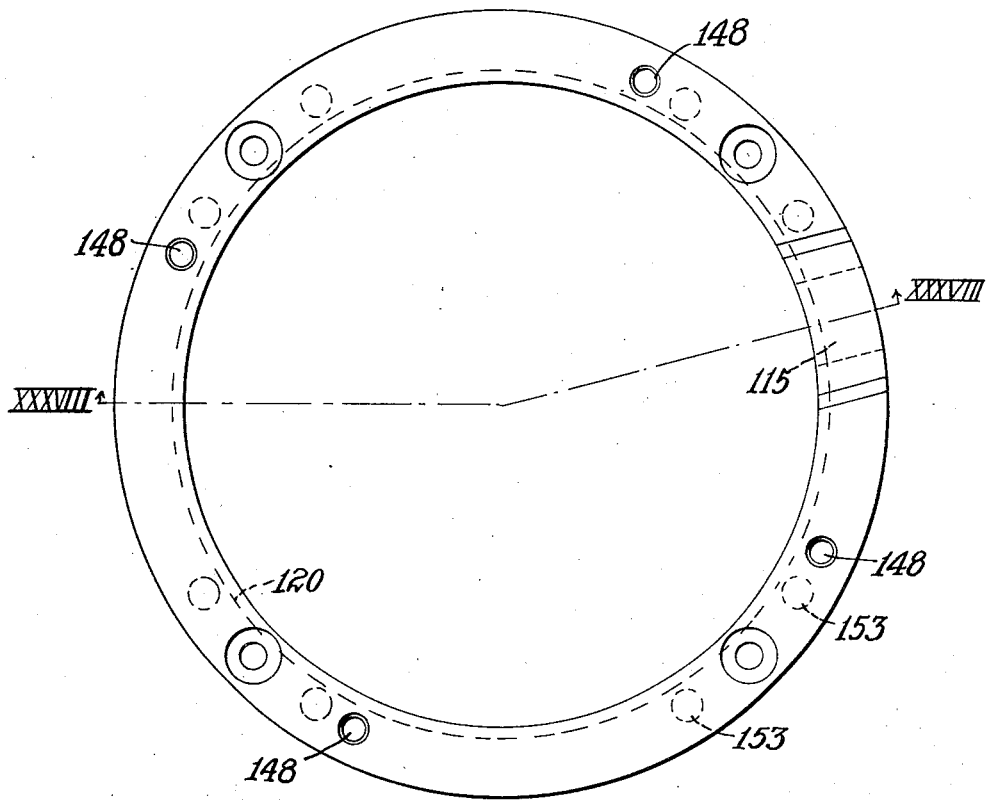
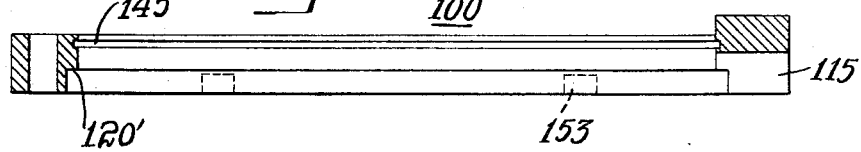
INVENTORS
John P. Melcher and
William D. Cappe
By Green & McCallister
Their Attorneys Nov. 6, 1934.　　　J. P. MELCHER ET AL　　　1,979,897
MACHINE FIXTURE
Original Filed Oct. 8, 1930　　17 Sheets-Sheet 12
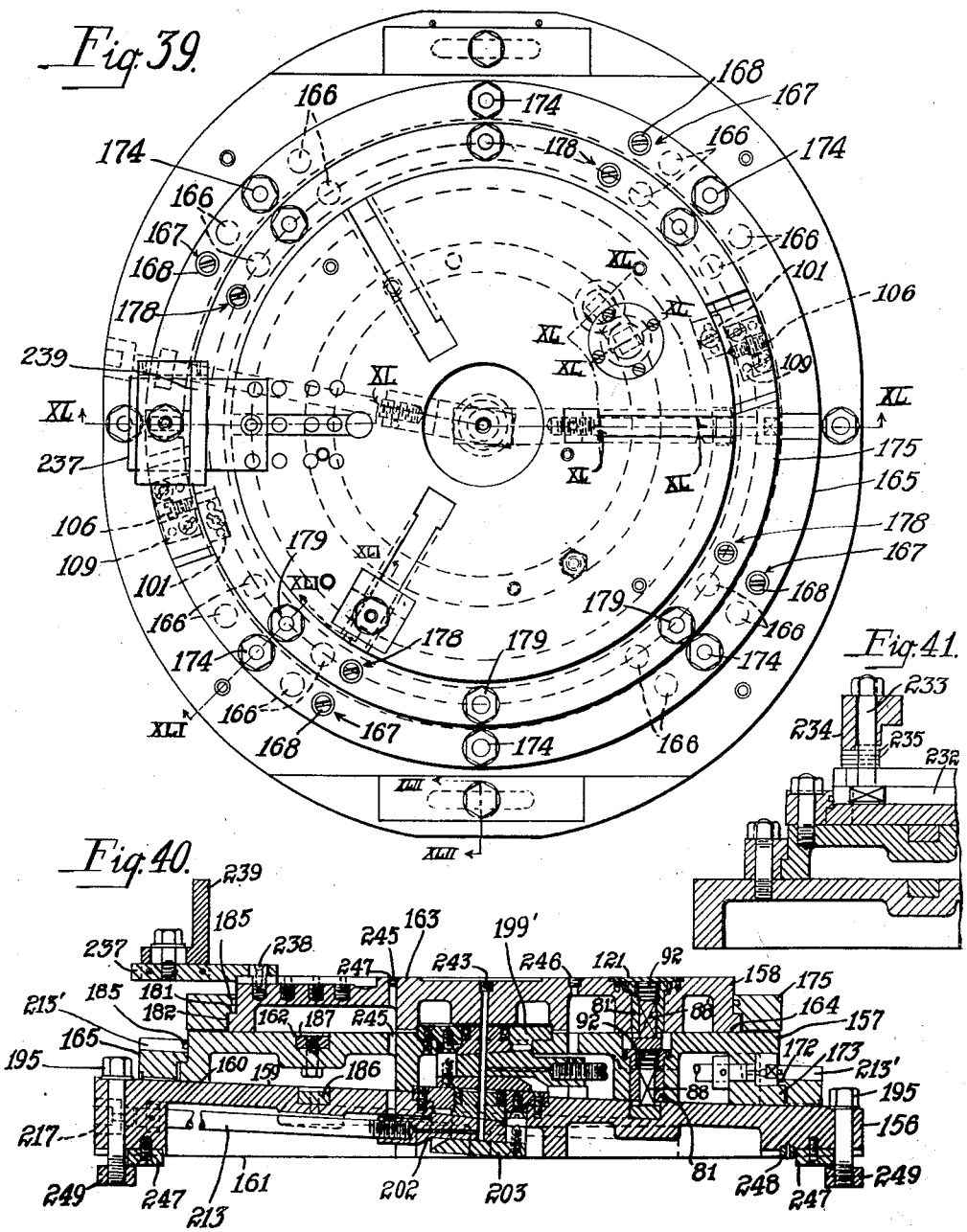

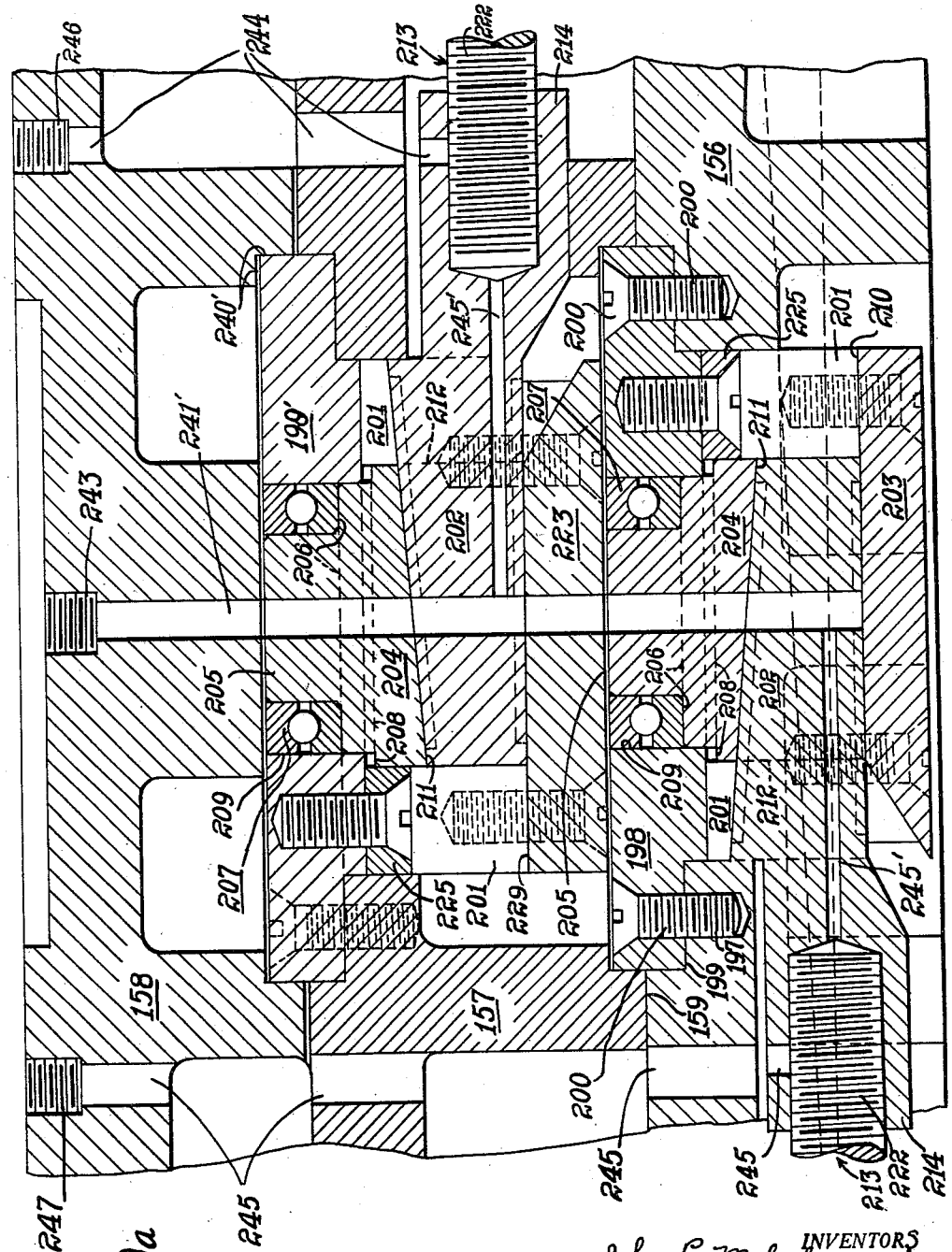

Nov. 6, 1934.   J. P. MELCHER ET AL   1,979,897
MACHINE FIXTURE
Original Filed Oct. 8, 1930   17 Sheets—Sheet 14
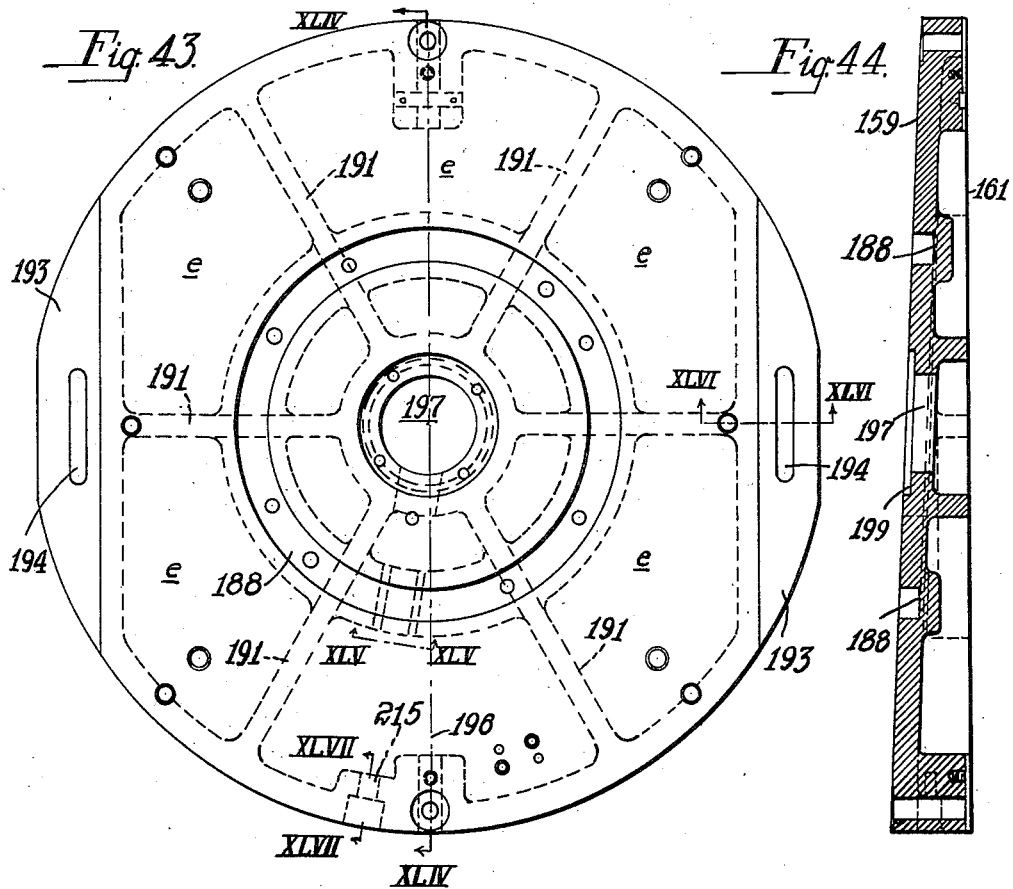
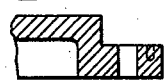
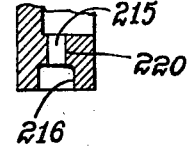
INVENTORS
John P. Melcher and
William D. Cappe
By Green & McCallister
Their Attorneys Nov. 6, 1934.    J. P. MELCHER ET AL    1,979,897
MACHINE FIXTURE
Original Filed Oct. 8, 1930    17 Sheets-Sheet 15
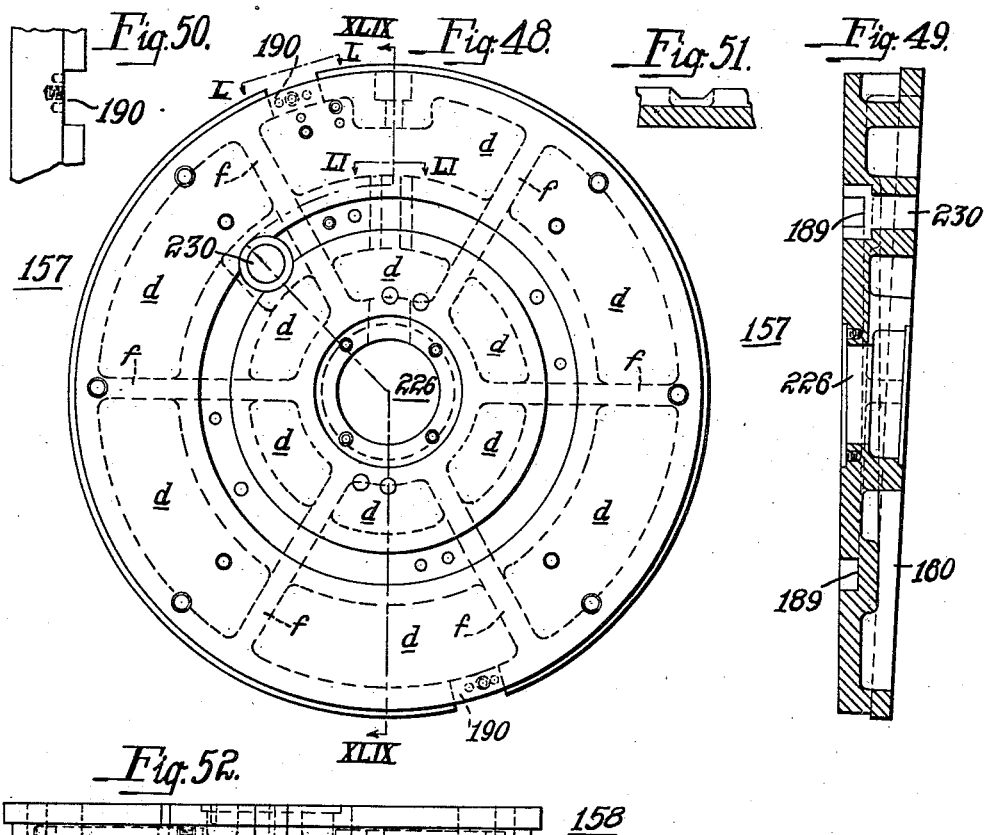
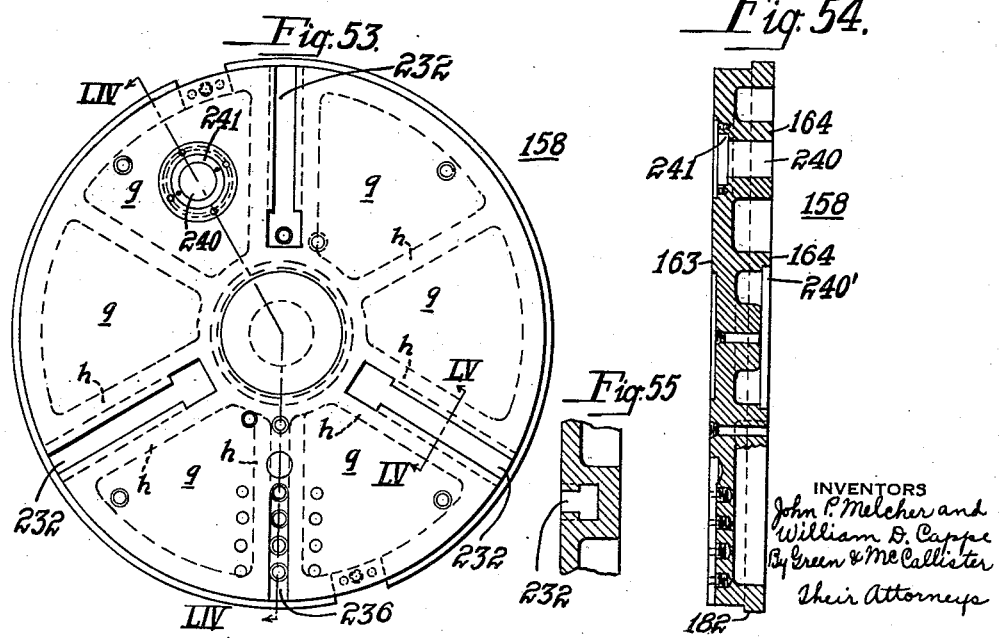

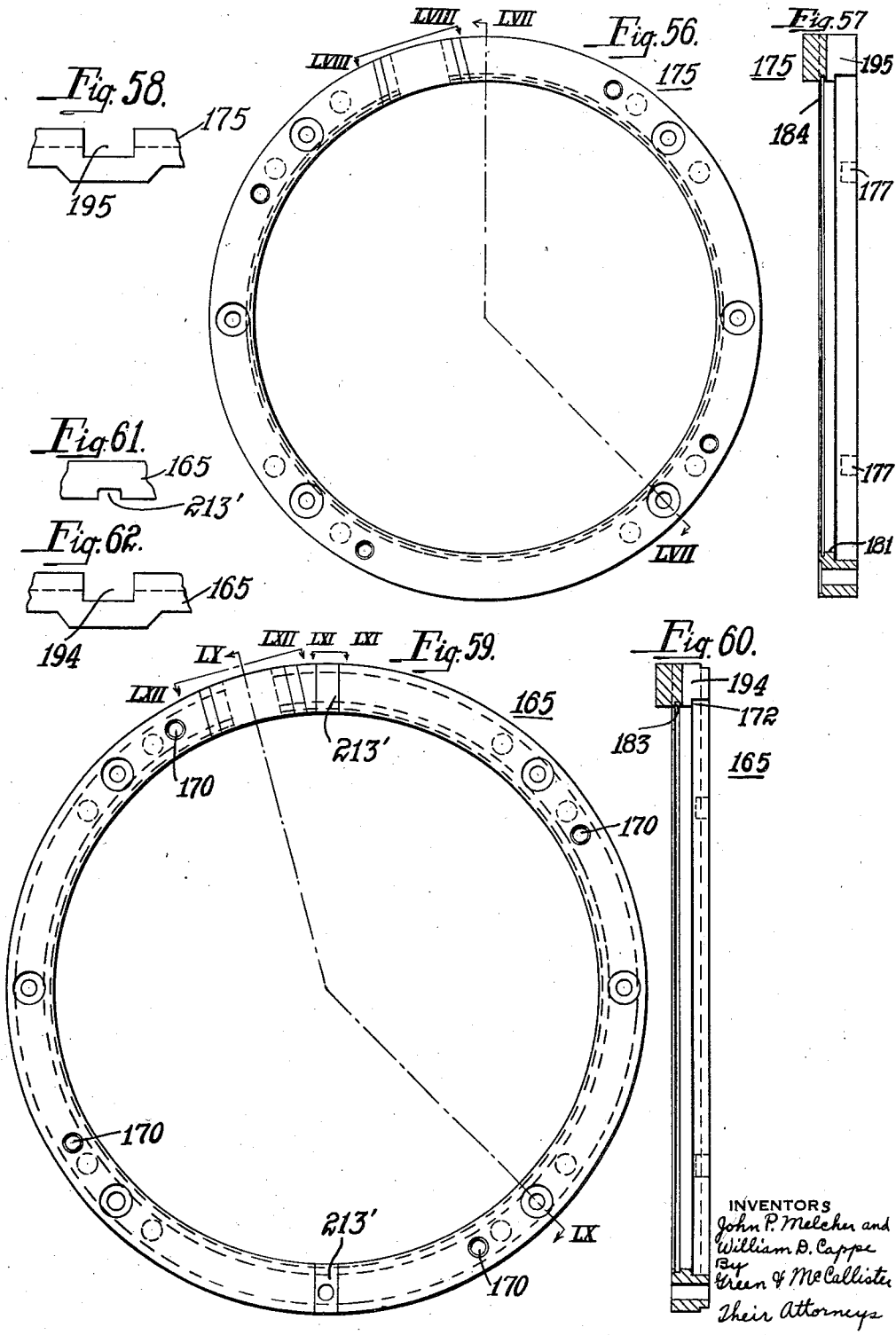

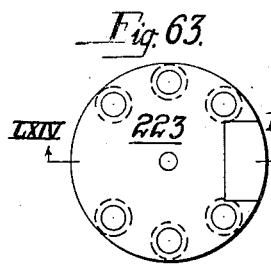
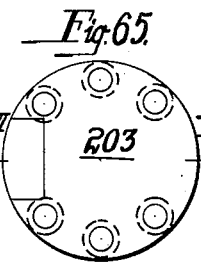
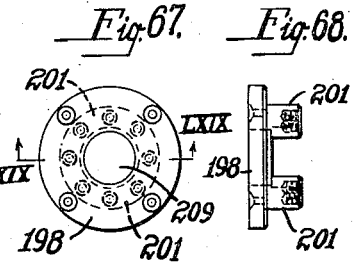
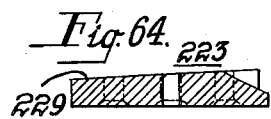
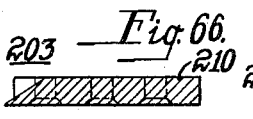
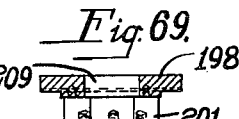
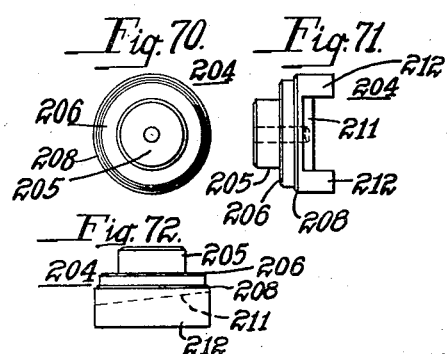
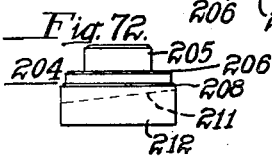
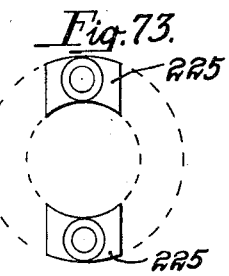
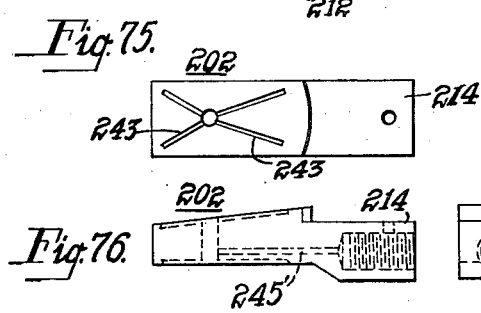
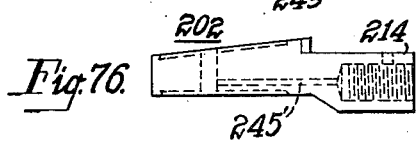
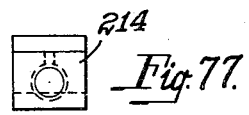
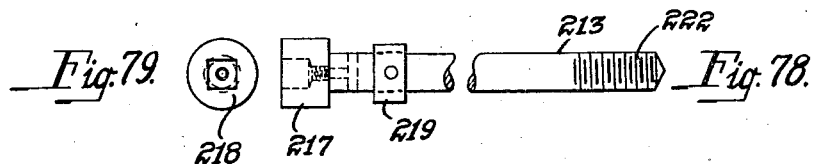

Patented Nov. 6, 1934

1,979,897

UNITED STATES PATENT OFFICE 1,979,897

MACHINE FIXTURE

John P. Melcher, Pittsburgh, and William D. Cappe, Glenshaw, Pa., assignors to Pittsburgh Valve, Foundry and Construction Company, Pittsburgh, Pa., a corporation of Pennsylvania Application October 8, 1930, Serial No. 487,253
Renewed February 16, 1933

13 Claims. (Cl. 279—5)

This invention relates to machine fixtures upon which bodies or objects to be machined may be attached and more particularly to fixtures that may be so manipulated as to permit surfaces or parts lying in angularly disposed planes to be machined without removing the bodies or objects from the fixtures or without changing the position of such bodies or objects with respect to that part of the fixture to which they may be attached.

In machines such as lathes, either of the horizontal or the vertical type, the work to be machined is turned and the cutting tool is held stationary. By such an arrangement the surface traversed by the tool lies in a plane perpendicular to the axis of the tool. Where such surfaces lying in parallel planes are to be machined, the work is merely advanced towards or from the tool along a line which is parallel to the axis of the tool.

The machining of parallel surfaces by machines of the type referred to above, as a general rule, does not involve the use of complicated jigs and fixtures for holding the work being machined. The fixtures employed for this class of work may be manufactured in large numbers so that a large number of machines may be put in service with assurance that the work completed on each and every machine will be identical for all practical purposes.

However, in some classes of work, as where valve seats of gate valves are to be machined, the problem of providing suitable fixtures becomes more complicated. This problem becomes more complicated, when, as at present, the trade requires such accuracy and precision in the machining of valve seats that the valve plugs of such valves may be interchangeable, thus making it unnecessary to carry in stock spare valve plugs for each and every gate valve of the same size that may be in service.

Fixtures heretofore constructed for machining the valve seats of gate valves do not embody the necessary niceties of construction by which it is possible to have several machines in operation with the assurance that accuracy of work turned out by one machine will be identical to the accuracy of work produced on each and every other machine. In order that it may be possible to obtain the same degree of accuracy from a large number of machines, it becomes necessary to devise a method whereby a large number of fixtures may be constructed exactly alike in every detail; and whereby the several parts of each fixture may be assembled in exactly the same manner so that a large number of machines may be utilized with the assurance that the work produced by the several machines will be exactly alike within plus or minus one thousandth of an inch in accuracy.

The bodies of gate valves, as known to the art, are provided with circular valve seats located in angularly disposed planes. The angles which such planes make with respect to a fixed plane located between the valve seats are as a general rule equal.

The valve passages surrounded by the valve seats are opened and closed by a valve plug, the opposite faces of which are parallel to the valve seats. Unless the valve seats are so formed that they are parallel to and disposed at the same angle as the angularly disposed faces of the valve plug, a leaky valve results. As leaky valves are not acceptable to the trade, such valves must either be discarded or machined over again and this necessarily entails loss of production, increased labor and material costs.

An object of this invention is the provision of a machine fixture whereby surfaces located in a plurality of planes whether parallel or disposed at angles to each other may be machined without removing the body containing such surfaces, from the fixture to which they are attached.

A further object of the invention is to provide a fixture in which a plurality of angularly disposed surfaces may be machined in articles of trade, such as gate valve bodies, with such precision that the angle at which the various surfaces are machined will be identical in all of the valve bodies within very close limits so that valve plugs may be used interchangeably therewith or the valve bodies may be used interchangeably with the valve plugs thereby making it possible for the consumer to carry a minimum number of spare parts for any given line of valves.

A still further object of the invention is to provide a method for making machine fixtures of the type referred to above whereby any number of such fixtures may be constructed, each fixture being an exact duplicate of another so that the work produced by one fixture will be exactly like the work produced by any other fixture.

Other objects of the invention will, in part, be apparent and will, in part, be obvious from the following description taken in conjunction with the accompanying drawings in which:

Figure 1 is a view in longitudinal vertical section of a gate valve which is illustrated for the purpose of clarifying the manner in which the invention may be utilized and of setting forth the objective to be accomplished by the invention;

Figs. 2, 3 and 4 are diagrammatic illustrations of a machine fixture, arranged and constructed in accordance with the invention, to which the valve body shown in Fig. 1 may be attached while machining the various surfaces requiring precision and accurateness;

Fig. 5 is a top plan view of a machine fixture arranged and constructed in accordance with the invention;

Fig. 6 is a fragmentary view in section taken on line VI—VI of Fig. 5;

Fig. 7 is a fragmentary view in section taken on line VII—VII of Fig. 5 illustrating the position and arrangement of a locking device arranged and constructed in accordance with the invention;

Fig. 8 is a longitudinal view of a detail embodied in the locking devices of the fixture shown in Fig. 5 and illustrated in the sectional view of Fig. 7;

Fig. 9 is an end view of the detail illustrated in Fig. 8;

Fig. 10 is a fragmentary view of a portion of the fixture shown in Fig. 5 looking in the direction of line X—X thereof;

Fig. 11 is a fragmentary view of a wedge plate embodied in the fixture shown in Fig. 5 looking in the direction of line XI—XI;

Fig. 12 is a top plan view of a locking plate embodied in the locking devices of the fixture shown in Fig. 5 and illusrated in Fig. 7;

Fig. 13 is a view in front elevation of the locking plate shown in Fig. 12;

Fig. 14 is an enlarged end view of a block embodied in the locking devices of the fixture shown in Fig. 5 and illustrated in section in Fig. 7;

Fig. 15 is a top plan view of the block shown in Fig. 14;

Fig. 15a is a fragmentary detail view taken on line XVa—XVa of Fig. 5;

Fig. 16 is a view in section of the fixture shown in Fig. 5 taken on line XVI—XVI thereof;

Fig. 17 is a view in section of a supporting or base plate embodied in the fixture and illustrated in section in Fig. 16;

Fig. 18 is a longitudinal view of an index pin embodied in the fixture shown in Figs. 5 and 16;

Fig. 19 is an end view of the index pin;

Fig. 20 is an end view of a bushing for accommodating the index pin illustrated in Figs. 18 and 19;

Fig. 21 is a view in longitudinal section of the bushing shown in Fig. 20 taken on the line XXI—XXI thereof;

Fig. 22 is a top plan view of the supporting or base plate shown in Fig. 17;

Fig. 23 is an edge view of the plate shown in Fig. 22;

Fig. 23a is a side view in elevation of a T-shaped nut adapted for use in the plate shown in Figs. 22 and 23;

Fig. 23b is a view in section of the nut taken on line A—A of Fig. 23a;

Fig. 24 is a top plan view of a wedge plate which is arranged to be slidably mounted in the supporting or base plate shown in Figs. 16, 17, 22 and 23;

Fig. 25 is a view in section of the wedge plate shown in Fig. 24 taken on line XXV—XXV thereof;

Fig. 26 is a top plan view of a wedge plate which is arranged for mounting on the wedge plate shown in Figs. 24 and 25;

Fig. 27 is a view in section of the plate shown in Fig. 26 taken on line XXVII—XXVII thereof;

Fig. 28 is a top plan view of an index ring arranged for mounting in a groove formed in the plates shown in Figs. 24, 25, 26 and 27;

Fig. 29 is an edge view of the index ring shown in Fig. 28;

Fig. 30 is a view in section of the ring taken on line XXX—XXX of Fig. 28;

Fig. 31 is a top plan view of a clamping ring for clamping the plate shown in Figs. 26 and 27 to the wedge plate shown in Figs. 24 and 25;

Fig. 32 is a view in section of the clamping ring taken on line XXXII—XXXII of Fig. 31;

Fig. 33 is a top plan view of a face plate to which the valve body of Fig. 1 may be attached, this plate being arranged for mounting on the wedge plate shown in Figs. 26 and 27;

Fig. 34 is a view in section taken on line XXXIV—XXXIV of Fig. 33;

Fig. 35 is an edge plan view of the face or end plate shown in Fig. 33;

Fig. 36 is a view in section of the wedge plate shown in Fig. 24 taken on line XXXVI—XXXVI thereof;

Fig. 37 is a top plan view of a clamping ring for clamping the face plate of Figs. 33 to 35 to the wedge plate of Figs. 26, 27 and 36;

Fig. 38 is a view in section of the clamping ring taken on line XXXVIII—XXXVIII of Fig. 37;

Fig. 39 is a top plan view of a modified form of machine fixture assembly arranged and constructed in accordance with the invention;

Fig. 40 is a view in section taken on line XL—XL of Fig. 39; Fig. 40a is a partial enlarged view taken on line XL—XL of Fig. 39;

Figs. 41 and 42 are fragmentary views in section taken on lines XLI—XLI and XLII—XLII, respectively, of Fig. 39;

Fig. 43 is a top plan view of a wedge plate embodied in the assembled machine fixture shown in Figs. 39 and 40;

Fig. 44 is a view in section of the wedge plate of Fig. 43 taken on line XLIV—XLIV thereof;

Figs. 45, 46 and 47 are fragmentary views in section taken on lines XLV—XLV, XLVI—XLVI and XLVII—XLVII of Fig. 43;

Fig. 48 is a top plan view of an intermediate wedge plate arranged for mounting on the wedge plate shown in Figs. 43 and 44;

Fig. 49 is a view in section taken on line XLIX—XLIX of Fig. 48;

Fig. 50 is a fragmentary edge view of the plate shown in Fig. 48 taken along lines L—L thereof;

Fig. 51 is a fragmentary view in section taken along line LI—LI of Fig. 48;

Figs. 52 and 53 are edge and top plan views, respectively, of a face plate arranged for mounting on the wedge plate shown in Figs. 48 and 49;

Fig. 54 is a view in section of the face plate shown in Figs. 52 and 53 taken on lines LIV—LIV of Fig. 53;

Fig. 55 is a fragmentary view in section taken on line LV—LV of Fig. 53;

Fig. 56 is a top plan view of a clamping ring for clamping the face plate shown in Figs. 52, 53 and 54 to the wedge plate shown in Figs. 48 and 49;

Fig. 57 is a view in section taken on line LVII—LVII of Fig. 56;

Fig. 58 is a fragmentary edge view of the clamping ring taken along the lines LVIII—LVIII of Fig. 56;

Fig. 59 is a top plan view of a clamping ring for clamping the wedge plate shown in Figs. 48 and 49 to the base plate shown in Figs. 43 and 44;

Fig. 60 is a view in section taken on line LX—LX of Fig. 59.

Figs. 61 and 62 are fragmentary edge views of the clamping ring taken along lines LXI—LXI and LXII—LXII, respectively, of Fig. 59;

Fig. 63 is a top plan view of a bearing plate for a wedge associated with the wedge plate of Figs. 48 and 49;

Fig. 64 is a view in section of the bearing plate of Fig. 63 taken on line LXIV—LXIV thereof;

Figs. 65 and 66 are top plan and sectional views, respectively, of a bearing plate for a wedge associated with the wedge plate of Figs. 43 and 44, the sectional view of Fig. 66 being taken on line LXVI—LXVI of Fig. 65;

Figs. 67 and 68 are top plan and edge views, respectively, of a detail embodied in the sectional assembly view of Fig. 40;

Fig. 69 is a view in section taken along line LXIX—LXIX of Fig. 67;

Figs. 70, 71 and 72 are top plan and edge views, respectively, of wedge plugs embodied in the assembled machine fixture and illustrated in the sectional view of Fig. 40;

Figs. 73 and 74 are top plan and edge views, respectively, of stop members embodied in the assembled sectional view of Fig. 40;

Figs. 75, 76 and 77 are top plan, side and end elevational views, respectively, of wedges embodied in the sectional assembly view of Fig. 40; and Figs. 78 and 79 are longitudinal and end plan views, respectively, of details employed for operating the wedges illustrated in Figs. 75 to 77, respectively.

Throughout the drawings and the specification like reference characters indicate like parts.

Since the machine fixtures arranged and constructed in accordance with the invention, as illustrated in the assembled and detail views of Figs. 5 to 79, inclusive, are employed for machining surfaces of the valve body illustrated in Fig. 1, a brief description of the valve body and the surfaces to be machined will be given in order that the problem involved in the machining of such surfaces may be understood.

In Fig. 1 of the drawings, a valve body 1 is shown having a passageway 2 through which fluids, such as water, steam, etc. may pass. At the opposite ends of the passageway flanges 3 and 4 are provided for attaching the valve body to pipes or conduits of a pipe line. The valve body is provided also with the usual neck or housing 5 within which a valve stem 6 and a valve plug 7 may operate to open and close the valve. The opposite faces of the valve plug 7 are provided with rings 8 and 8', of bronze or other suitable material, that cooperate with rings 9 and 9' forming the valve seats, to provide a means for obtaining a fluid-tight joint between the rings 8—9 and 8'—9' when the valve plug is in the closed position.

As shown in Fig. 1, the rings 9 and 9' are mounted in annular recesses 10 and 10' and have screw thread engagement therewith as indicated at 11 and 11'. The recesses in which the rings 9 and 9' are disposed are usually inclined at an angle with respect to the longitudinal axis 12 of the valve plug and stem. This angle is such that the seating surfaces on the rings 9 and 9' will be parallel to the seating surfaces of the rings 8 and 8' carried by the valve plug 7. In order that a fluid-tight valve may be obtained, the recesses 10 and 10' must be so accurately formed in the valve body that the valve seats 9 and 9' may be disposed therein at the proper angle to obtain a fluid-tight valve when the valve plug is in the closed position. With reference to the particular valve shown in Fig. 1, it will be observed that the circular recesses 10 and 10' are disposed at an angle $2a$ to the axis 12 of the valve body and that the angle between the recesses is $4a$ (see Figs. 1 and 2 to 4, inclusive).

In order that the surfaces 13 and 14 on the flanges 3 and 4, the valve seat recesses 10 and 10' and the ribs which guide the valve plug 7 may be machined with such accuracy that the valve plug of one valve of a particular size may be used interchangeably with other valves of the same size, a machine fixture M. F., illustrated schematically in Figs. 2, 3 and 4, is provided. The fixture M. F. is of such form, construction and arrangement that the surfaces 13 and 14 of the flanges 3 and 4 may be machined parallel to each other, the guide ribs for the valve plug may be machined and the valve seat recesses 10 and 10' may be formed with such degree of accuracy that the surfaces of all valve bodies finished on fixture M. F. will be identical within plus or minus one one-thousandth of an inch in degree of accuracy.

In order that a large number of fixtures M. F. may be constructed so that one fixture will be exactly like any of the other fixtures thereby making it possible to have a large number of machines producing the same class of work, and so that the work produced on one machine will be identical in accuracy to the work produced on any other machine, a novel method has been devised for constructing such fixtures. This method will be described in detail in a subsequent section of the specification.

The machine fixture M. F. as schematically illustrated in Figs. 2, 3 and 4, comprises taper plates 17 and 18 and a face plate 19 to which the valve body 1 is clamped. The plates 17, 18 and 19 are preferably of circular form and of such thickness that the plates shall not bend or lose their shape when subjected to stresses or loads.

With reference to Fig. 2, it will be observed that face 20 of plate 17 is inclined or tapered at an angle $a$ to the bottom face 21; likewise, face 22 of plate 18 is inclined or tapered at an angle $a$ with respect to its opposite face 23; and plate 19 is so formed that faces 24 and 25 thereof are parallel to each other. By positioning the plates 17 and 18 as shown in Fig. 2, the tapered faces 20 and 22 slope or are inclined in diametrically opposed directions so that faces 25, 23 and 21 of plates 19, 18 and 17, respectively, are parallel to each other. Therefore, when the valve body is mounted on or attached to face 25 of plate 19, the valve seat recesses 10 and 10' are disposed at angles $2a$, respectively, with the faces 25, 23 and 21 of the said plates. Also, when the plates 17, 18 and 19 are in the position shown in Fig. 2, the flanges 3 and 4 of the valve body are parallel to faces 25, 24, 23 and 21 of the plates.

It will be understood that the fixture M. F. is arranged for mounting either on the spindle of the horizontal type lathe or upon a rotatable table of a vertical type machine, as, for example, a machine known to the trade as the Bullard vertical turret lathe. In Figs. 2, 3 and 4 the fixture M. F. is shown in connection with the horizontal type lathe. The plate 17 is shown as attached to a plate 39 secured to a spindle 26 of a lathe (not shown) so that the fixture may be rotated about the axis of rotation of the spindle. As illustrated, in Figs. 2, 3 and 4 and, as will be disclosed in detail in connection with the description of the assembled fixtures shown in Figs. 5, 16, 39 and 40, the fixture is movably and adjustably attached to the plate 39 in order that the fixture may be shifted laterally of the axis of rotation so that the centers of the valve seat recesses may coincide with the axis of the lathe spindle.

Referring again to Fig. 2, the valve body 1 is shown mounted in place on the face plate 19 and is so positioned that the axis 14 of passageway 2 is centered on and coincident with the axis of rotation of spindle 26; also the valve body is centrally located on face 25 of plate 19. When the plates of fixture M. F. occupy the positions shown in Fig. 2, the flanges 3 and 4 and the guide ribs of the valve body may be machined. In this case, the flanges are machined parallel to the face 21 of the plate 17 because the face 21 is perpendicular to the axis of rotation of the spindle 26.

It is to be understood, of course, that after one flange is machined the body is turned end-for-end and clamped to plate 19 so that the other flange may be machined. After machining the flanges and the guide ribs of the valve body, plates 18 and 19 are rotated 180 degrees to the position shown in broken lines in Fig. 3. In this position it will be observed that the tapered faces 20 and 22 slope in the same direction and that, therefore, the angle between face 21 of plate 17 and faces 23, 24 and 25 of plates 18 and 19, respectively, is equal to the sum of angles $a$, (the angle of taper of faces 20 and 22) or angle $2a$. Since, when the valve body is in the position shown in Fig. 3, the valve seat recess 10 is inclined at an angle $2a$ and in the opposite direction with respect to the angle $2a$ to which the face 25 of plate 19 is inclined, the recess 10 lies in a vertical plane. In this position the valve seat recess is parallel to face 21 of plate 17 and perpendicular to the axis of spindle 26, but the center of the recess is off center with respect to the axis of rotation of the spindle 26 by the distance $b$. Therefore, in order that the center of the circular recess 10 may be coincident with the center of rotation of the spindle 26, the fixture M. F. is moved bodily at right angles to the spindle from the broken line to the full line position. In the full line position, the center of rotation of the recess 10 coincides with the axis of rotation of the spindle. The valve seat recess may now be machined by rotating the spindle and the fixture attached thereto and advancing the tool (not shown) into the work in the usual manner.

In order that the valve seat recess 10′ may be machined, its position must be so changed that it will lie in a plane parallel to the face 21 of plate 17 and perpendicular to the axis of spindle 26. To place the recess 10′ in this position, the plate 19 is rotated exactly 180 degrees to the position shown in Fig. 4 in which position valve seat recess 10′ lies in a plane parallel to face 21 of plate 17, perpendicular to the axis of spindle 26 and its center of rotation is coincident with the center of rotation of the spindle.

The accuracy and precision with which the plates 18 and 19 are turned as a unit, and with which plate 19 is turned, through angles of 180 degrees, are obtained and accomplished by an indexing mechanism embodied in the plates. The construction and operation of this indexing mechanism will be described hereinafter in detail.

It will be observed that with the fixture M. F., the flange 3, the guide ribs, and the valve seat recesses 10 and 10′ may be machined to the finest degree of accuracy because these operations may be performed without removing the valve body from the fixture.

Upon completion of the recesses and the cutting of the screw threads therein as at 11—11′ (see Fig. 1) the valve seats 9—9′ may be turned into position by rotating the fixture and holding the rings 9—9′ stationary by means of a suitable tool.

In certain classes of valves, the valve seat rings 9—9′ are not used. However, in such cases, the valve seats are formed as an integral part of the valve body. It is to be understood, therefore, that the machine fixture M. F. is adapted for use with such valves also, because the valve seating surfaces, though integral with the valve body, may be machined in the same manner that the valve seat recesses 10—10′ are formed in the valve body shown in Fig. 1 of the drawings.

Referring to Figs. 5 and 16, an assembled machine fixture M. F. embodying the principles of construction illustrated schematically in Figs. 2, 3 and 4 is shown. For the sake of simplicity, parts or elements embodied in the assembled machine fixture which correspond to those illustrated schematically in Figs. 2, 3 and 4 will be designated by the same reference characters. The machine fixture M. F. comprises the taper plates 17 and 18 and the top or face plate 19. The plates 17, 18 and 19 may be attached to a base plate 29 which, it will be understood, is secured to a plate 39 attached to the spindle 26 (see Fig. 17). It will be understood that machine fixture M. F. of Figs. 5 and 16 is adapted for use in connection with the so-called horizontal lathe. In such a lathe, the spindle 26 lies in a horizontal plane.

The base plate 29, as shown in Figs. 16, 17, 22 and 23 may be made from a plate of steel or suitable metal having parallel faces 31 and 32. Face 32 is provided with a plurality of tapped holes 33 to accommodate bolts 34 (see Figs. 16 and 17) by attaching or securing the fixture to the plate 30. Face 32 of base plate 29 may be provided also with concentric recesses 35 and 36 for accommodating bosses 37 and 38, respectively, formed on plate 39 (see Fig. 17). Face 31 of the base plate 29 may be provided with a dovetail groove 41 that extends diametrically across the entire upper face of the plate as shown in Fig. 22. Also this face of plate 29 may be provided with grooves 42 and 43, of substantially T-shape in section, (see Fig. 23) disposed on each side of the dovetail groove 41 and in parallel relation thereto for the reception of T-shaped blocks 44 (see Figs. 15a, 23a and 23b). The blocks 44 may be drilled and tapped as at 45 for accommodating studs 46 employed to secure the taper plate 17 to the base plate 29 in any position to which it may be adjusted along the dovetail groove.

The studs 46 have elongated heads disposed in relatively large holes or apertures 46′ formed in clamping ring 70. By this form of construction the clamping ring may be released without loosening or manipulating studs 46 in any manner. Also, the studs 46 may be loosened to permit lateral shifting of plate 17 without loosening or releasing the clamping ring 70.

As shown in Figs. 16, 22 and 23, the base plate 29 is provided with an opening or aperture 47, preferably rectangular in form and located medially of the undercut edges of the dovetail groove 41 and near to the periphery thereof. This groove accommodates a traveling nut 48 (see Fig. 16) which is attached or secured to face 21 of taper plate 17 by countersunk screws 49. The edge of the plate 29 adjacent to the outer end of the opening or aperture 47 may be drilled and countersunk as at 50 and 51 for the reception of a screw 52 that extends into the opening or aperture 47. Screw 52 has threaded engagement with the traveling nut 48.

As shown in Fig. 16, the outer end of the screw 52 is provided with an enlarged head 53 having a countersunk socket 54 into which a tool may be inserted for turning the screw to thereby advance the traveling nut 48 and the taper plate 17 back and forth along the dovetail groove 41. In order to prevent longitudinal movement of the screw 52, it is provided with a collar 55 attached thereto by a pin 56. The collar and the enlarged head 53 of the screw being disposed on opposite sides of a wall or web 57, the screw is prevented from moving longitudinally of the aperture or opening 47.

In Figs. 24, 25 and 36 the construction of the taper plate 17 is illustrated in detail. Plate 17 may be cast of steel or suitable metal in a mold conforming generally to the shape of the finished plate. In order to lighten the plate in its finished form, the face 21 may be cored or hollowed out in the regions indicated at c in Fig. 24 of the drawings. To further strengthen the plate, radial ribs 60 may be provided. Face 21 of this plate has a dovetail projection 62 extending diametrically across the plate, as shown in Figs. 24 and 36, and is so shaped that it will register in the dovetail groove 41 formed in face 31 of base plate 29.

The face 21 of the plate 17, it will be understood may be machined to such degree of accuracy that the ribs and the marginal edge of the plate will lie in a plane surface.

As illustrated in Figs. 24 and 36, the bottom face 21 of the plate 17 is provided with a recess 62' for accommodating a flange or head 63 forming an integral part of the traveling nut 48 (see Fig. 16). The recess 62' is located on a diameter of plate 17 which lies along line XXXVI—XXXVI of Fig. 24.

Face 20 of plate 17 is machined on a taper and the angle of slope will be determined by the angle at which the valve seat recesses 10—10' are disposed with respect to the axis 12 of the valve body. Where the valve seats are disposed at an angle 2a with respect to the axis 12 of the valve body, the face 20 of the plate 17 will be machined so that the angle of slope is equal to half the angle of inclination of the valve seat recesses or an angle a.

As will be observed by reference to Figs. 5 and 16 of the drawings, the taper plate 18 is of smaller diameter than the taper plate 17. In order that plates 17 and 18 shall occupy a substantially fixed central position with respect to each other, the plate 17 is provided with an upstanding circumferential flange 64 which surrounds the edge of the adjacent surface 22 of plate 18. The circumferential flange 63 it will be understood is machined on an angle or taper, the slope of which is identical with the angle of slope of face 20 of plate 17.

As shown more clearly in Fig. 25, face 20 of plate 17 is provided with an annular groove 65 in which may be placed an index ring 66 (see Figs. 16, 20, 29 and 30). The form and construction of the index ring 66 and the purpose for which it is provided will be described in detail in subsequent sections of this specification. As illustrated in Fig. 24, the plate 17 is provided with drilled holes 67 at its marginal edge through which the studs 46 (see Fig. 5) may pass.

Plate 17 is drilled and tapped also at 68 for the reception of screws 69 employed to secure a clamping ring 70 thereto, the clamping ring being utilized to clamp the tapered plate 18 in fixed position on the taper plate 17.

The taper plate 18 is illustrated in detail in Figs. 26 and 27 of the drawings. Plate 18 may be cast of steel or suitable metal in a mold conforming generally to the shape of the finished plate. As in the construction of the plate 17, the plate 18 may be cored or hollowed out at the regions indicated at c', in order that the weight of the plate may not be excessive, and may be strengthened by means of radial ribs 71. Face or surface 23 of plate 18 may be machined with accuracy so that all points in this surface will lie in a common plane. At the margin of the face or surface 23 a circumferential upstanding flange 72 may be formed within which the face plate 19 may be disposed.

In order that the plate 18 may be turnably attached to the face plate 19, a recess 73 is formed at the center of the face 23 for the reception of a trunnion 74 (see Fig. 16). The trunnion 74 may be secured to the plate 18 by countersunk screws 75. As shown in Fig. 16, the trunnion 74 extends upwardly through the center of plate 18. Plate 18 is held in position on the trunnion by means of a ring nut 76 having threaded engagement with the upper end of the trunnion, and which is locked in position by a dowel pin 77.

Referring to Figs. 16, 26 and 27, it will be observed that surface 23 of plate 18 is provided with an annular recess 78 for accommodating an index ring 79 (see Fig. 16), that is similar in construction to the index ring 66 illustrated in Figs. 28, 29 and 30.

In order that the taper plate 18 may be turned on plate 17 through angles of predetermined values, an index pin 88 is provided that co-operates with the index ring 66 in plate 17. The index pin is mounted in a bushing 81 which is disposed in a countersunk opening 80 formed in plate 18. The bushing has a circumferential flange 82 nested in the countersunk opening 80. Dowel pin 84 extending through the flange and into the plate may be employed to secure the bushing in proper position.

As shown in detail in Figs. 19 and 20, the bushing has a countersunk opening 86 that terminates in a polyhedral shaped opening 87 that corresponds in shape to the shape of the body of the index pin. As a preferred form, the body of the pin and the opening 87 in the bushing may be square in transverse section. The upper end of the index pin 88 terminates in a circular flanged head 89 which is disposed to rest upon the bottom of the countersunk opening 86 as at 90. Index pin 88 is yieldingly urged towards the position shown in Fig. 16 by a spring 92 located between the under surface of the index ring 79 of plate 18 and the circular head or flange 89 of the index pin. The index pin 88 cooperates with the index ring 66 of plate 17 in such a way that the position of the plate 18 with respect to plate 17 may be determined in a manner which will be subsequently set forth in detail.

At the center of surface 22 of plate 18 an annular recess 93 is provided for the reception of a trunnion 94, the body of which extends downwardly through an opening or aperture 95 formed at the center of the taper plate 17 (see Fig. 16) whereby plate 18 is turnably mounted on plate 17. Plate 18 may be secured in position with respect to the plate 17 by a retaining ring 96 secured to the trunnion by countersunk screws 97. The marginal edge of the ring 96 engages an annular shoulder 98 formed in the plate 17 whereby movement of the trunnion longitudinally of the opening 95 in plate 17 is prevented.

As shown in Figs. 16, 26 and 27, the margin of the plate 18 adjacent to surface 22 thereof is provided with an annular or circumferential flange 99 that is engaged by clamping ring 70 releasably secured to the plate 17 whereby the plate 18 may be clamped in position to the plate 17. As shown in Fig. 16 the clamping ring 70 is disposed on and slightly overhangs the annular upstanding flange 64 of plate 17.

In order that the plates 17 and 18 may be locked in one or the other of the positions illustrated schematically in Figs. 2, 3 and 4, taper plate 18 is provided with locking plates 101 (see Fig. 5) which, in the present embodiment of the invention are diametrically opposite each other. The locking plates 101 are illustrated in detail in Figs. 12 and 13. Locking plates 101 are disposed in recesses 102, formed in the face 22 at the periphery of the plate (see Figs. 11 and 26), and may be secured to plate 18 by means of a countersunk screw 104 and dowel pins 105.

To cooperate with the locking plates 101 for the purpose of accurately locking the taper plates 17 and 18 in one or the other of their operative positions, illustrated in Figs. 2, 3 and 4, a lock screw 106 is provided. Lock screw 106 has a tapered end portion 107 that cooperates with an angularly disposed surface 108 formed on each of the locking plates 101. The angle of taper of the sloping surfaces 108 and the tapered end portion 107 of screw 105 is such that when the screw is turned inwardly towards the locking plate when adjacent thereto, plate 18 is caused to turn in a counter-clockwise direction as viewed from Fig. 5. The plate turns in this direction until the index pin 88 strikes a stop or shoulder on index ring 66 as will be more fully set forth in detail.

Lock screw 106 extends through a block 109 illustrated in detail in Figs. 14 and 15, and has screw-threaded engagement with said block as at 109'. Block 109 has a countersunk opening 110' for accommodating the head 110 of the lock screw. When the screw is in locking position, the outer end of the head is flush with the marginal or peripheral surface of clamping ring 70 (see Fig. 7). In order that a tool may be employed to turn the screw 106, the head 110 thereof is provided with a countersunk polyhedral socket 111 for accommodating such tool.

As shown in Figs. 7 and 10, the block 109 is secured to the face of the upstanding annular flange 64 of plate 17 by countersunk screws 112 and dowel pins 113. As illustrated in Figs. 10, 31 and 32, the clamping ring 70 is provided with a recess 115 formed on its under face for housing the block 107. The recess provides clearance between the block 107 and the ring 70 so that the ring may be clamped to the plate 17.

The face plate 19 is illustrated in detail in Figs. 33, 34 and 35. This plate may be cast of steel or other suitable metal and cored or hollowed out on its face 24, as at $d$ in order to decrease its weight, and strengthened by radial ribs 117. Faces 24 and 25 are machined with such accuracy that they are parallel to each other. The center of plate 19 is provided with an aperture 118 for accommodating the trunnion 74 secured to plate 18 (see Fig. 16). In order that the clamping ring 100 may cooperate with the plate 19 to clamp it in position on plate 18, plate 19 is provided with a circumferential flange 119 located adjacent to the face 24 of the plate. An annular inwardly extending flange 120 of the clamp ring 100 engages the circumferential flange 119, as illustrated in Fig. 16, so that when the screws 69 are tightened the plate 19 is clamped or secured to the plate 18.

In order that plate 19 may be indexed to one or the other of its positions, as schematically illustrated in Figs. 2, 3 and 4, it is provided with an index pin 88' which is mounted in a bushing 81'. The bushing is disposed in an opening or aperture 120 formed in the plate 19. The index pin and bushing are similar in construction to the pin 88 and bushing 81 shown in detail in Figs. 18, 19, 20 and 21, and cooperates with index ring 79 mounted in plate 18 in such a manner that plate 19 may be turned accurately and with precision through predetermined angles. The index pin 88' of plate 19 is yieldingly urged to the position shown in Fig. 16, by a spring 92 disposed between the circular head or flange 89' of the index pin and a cover plate 121, which is secured within an annular recess 122, formed on face 25 and concentric with the countersunk opening 120. The cover plate may be secured in place by countersunk screws 123.

As illustrated schematically in Figs. 2, 3 and 4, the valve body 1 is secured in place on face 25 of plate 19. In order that valve bodies of different sizes may be machined on the fixture M. F., the face 25 of plate 19 is provided with a gauge 125 which is slidably disposed in a dovetail groove 126 having in its bottom surface a plurality of tapped holes 127. The holes 127 are spaced at predetermined points according to the size of valve bodies to be machined on the fixture, for the reception of a cap screw 128 employed to secure the gauge 125 in its proper place. Gauge 125 may be provided with an angle member 130 that is adjustably secured thereto by means of a bolt 131. The flange 130 is adapted to lie flush against flange 4' of the valve body 1 and may be utilized as a means whereby the longitudinal axis 14 of the passageway 2 of the body may be centered with respect to the center of the face plate 19. To provide for securing the valve body 1 by one or the other of its flanges 3 and 4 to the face 25 of plate 19 radially extending T-slots 132 may be formed in said face for the reception of the heads of bolts (not shown) to clamp the valve body to the plate. The slots 132, as shown in Figs. 5 and 33, are disposed at angles of 120 degrees to each other in order to permit of accurately locating and securing the valve body to the plate.

The index rings 66 and 79 are similar in construction and of the same size (see Fig. 16). Therefore, only the index ring 66 shown in detail in Figs. 28, 29 and 30, need be described in detail. The index ring 66 is of ring-like construction and is of such width and thickness that it will have a press-fit with the grooves 78 and 65 of plates 18 and 17, respectively. When in place in these grooves, the top faces of the index rings lie flush with surfaces 23 and 20, respectively, of these plates.

The bottom faces 134 of the respective index rings lie in one plane so that they will lie flush upon the bottom of the grooves in the plates 17 and 18. The top faces 135 of these rings, however, are provided with cam surfaces 136 and 137, which, in the present form of the invention, are diametrically opposed as illustrated in Fig. 28. The cam surfaces 136 and 137 slope downwardly from the surface 135 of the ring and terminate in depressions 138 and 139, respectively. Depressions 138 and 139 terminate in shoulders or stops 140 and 141, which, in the present form of the invention, are exactly 180 degrees apart. Shoulders 140 and 141 present a flat surface against which one of the flat sides of the index pins 88 and 88' abut when the lock screws 106 occupy their locking positions, as illustrated in Figs. 5 and 7.

Before the index rings 66 and 79 are mounted in place on plates 17 and 18, the plates are mounted upon each other and turned to such a position that faces 21 and 23 are absolutely parallel to each other. Such parallel relation of these faces may be determined by suitable tools, well known in the art. Such tools or instruments are employed for determining whether or not a plane surface is parallel to another surface which is made parallel by construction so as to form a base or reference for determining whether or not a plane surface of a body placed on such reference surface is parallel thereto. When faces 21 and 23 of plates 17 and 18 are parallel, as determined by the method referred to above, the plates are marked at their peripheries to indicate the position the two plates must occupy in order that the surfaces 21 and 23 may be parallel. The plates are then removed or separated and the index rings mounted in the grooves in such a position that one or the other of the shoulders or stops 140 and 141 will exactly coincide with the marks on the plates.

When the index ring is so placed in the groove, the shoulders or stops 140 and 141 will be along a diameter passing through the points of minimum and maximum thickness; in other words, the stops or shoulders will lie on the diameter of maximum slope or taper.

The index rings being thus accurately located and positioned in the grooves of the plates 17 and 18, the countersunk holes 80 and 80' of the plates may be accurately located so that when a flat surface of these pins engages one or the other of the shoulders 140 and 141 of the index rings, the plates will occupy the exact position intended. The flat faces of the pins that engage the shoulders or stops in the index rings will lie on the diameter of maximum slope or taper. In order that the index rings may be removed from the grooves in which they are located in plates 17 and 18, the rings are drilled and tapped as at 143 for accommodating a tool for pulling the rings out of the grooves.

The clamping rings 70 and 100 are illustrated in detail in Figs. 31, 32, 37 and 38, respectively. The diameter of the ring 70 is slightly larger than the diameter of ring 100 as is evident by inspection of Fig. 16, because plate 18 is of larger diameter than the face plate 19. The respective clamping rings are provided with inwardly extending circumferential flanges 120 and 120' that overhang the circumferential outwardly extending flanges 99 and 119 of the plates 18 and 19 (see Fig. 16).

The clamping rings are also provided with circumferential grooves 145 and 145', respectively, located adjacent to its upper face in which packing 146 of any suitable form or composition may be placed. The packing prevents splinters or chips of metal from entering between the cooperating surfaces of the clamping rings of the plates. If such chips or splinters of metal should enter between these surfaces, the precision of the machine fixture M. F. might be impaired. In the operation of the machine fixture M. F. the clamping rings 70 and 100 must be released from their clamping positions in order to permit the plates 18 and 19 to be turned. In order to insure, however, that these clamping rings shall release properly when the screws 69 are loosened, the clamping rings are mounted on springs 147, see Figs. 5 and 6. As illustrated in Fig. 5, the springs are located on each side of the screws 69 so that when the screws are loosened, the springs will urge the clamping rings upwardly so as to thereby cause the overhanging flanges 120 and 120' to become disengaged from the flanges 99 and 119 formed on the plates 18 and 19.

To insure that the clamping rings will be elevated by the same amount at all points so as to thereby prevent the rings from assuming an inclined position (a position which would cause the rings to bind on the plates and thereby prevent them from being turned the proper amount with ease), stop bolts 150 are provided. These bolts extend through countersunk holes 148 formed in the rings, see Fig. 6, and have screw thread engagement with the plates 17 and 18. The bolts 150 have relatively large heads 151 that engage the bottom of the countersunk holes 148 as at 152, when the rings have been elevated by the springs 147 to the proper position. The heads 151 of these bolts, therefore, act as stops and limit the upward movement of the clamping rings. When all of the screws 69 are loosened, the clamping rings will have moved parallel to themselves in an upward direction the proper distance, which distance is determined by the stop bolts.

The springs 147, as shown in Fig. 6, operate in recesses 153 formed in the under faces of the clamping rings, so that when the fixture is assembled, the springs are inclosed and hidden from view.

Operation

The operation of the machine fixture M. F. will be described in connection with Figs. 5, 6, 7 and 16 of the drawings. Assuming that a valve body 1 has been secured to the face 25 of the face plate 19 in the manner indicated in Fig. 2 of the drawings, and that the plates 17, 18 and 19 occupy the position shown in Fig. 16, and illustrated schematically in Fig. 2, the fixture is then in such a position that the flange 3 of the valve body may be machined as well as the ribs which guide the valve plug 7, see Fig. 1. It will be understood that the flange 3 is machined by rotating the fixture on the spindle 26 of the lathe or machine. The flange 4 of the valve body may be machined by turning the valve body end-for-end and clamping it to the face 25 of plate 19.

Assuming that both flanges 3 and 4 have been machined, the valve body is caused to remain in its clamped position on the face plate 19 when the last of flanges 3 and 4 have been machined. In order to cause the valve seat recess 10 to lie parallel with face 21 of plate 17 and perpendicular to the axis of rotation of the spindle 26, the screws 69, which clamp the clamping ring 70 to the plates 17 and 18, are loosened so that the springs 147 may raise the clamping ring out of clamping position with the plates. Before plates 18 and 19 can be turned, the lock screw 106 on plate 17 is backed out of block 109 so as to permit the locking plate 101 on plate 18 to pass the end of the screw. Plates 18 and 19 may then be rotated as a unit on the plate 17 about the trunnion 94 as an axis.

Plates 18 and 19 are rotated in a clockwise direction, as viewed from Fig. 5, 180 degrees until the index pin 88 slips over one or the other of shoulders 140 and 141, depending upon the position of the clamping ring in the plate 17, and falls into one or the other of the recesses 138 and 139. The click of pin 88 as it drops into one or the other of these recesses is such that the operator can hear it. Plates 18 and 19 are then rotated in a counter-clockwise direction until the pin 88 abuts against one or the other of the shoulders 140 and 141. When the flat surface of one of the sides of the pin 88 engages with a shoulder on the clamping ring, when turning plates 18 and 19 in a counterclockwise direction, further turning movement thereof is prevented. The lock screw 106 secured to plate 17, see Fig. 7, is then advanced into the block 109 so that the tapered end 106 of the screw comes into engagement with the tapered surface 108 of the locking plate 101. By turning the screw 106 in this manner, the wedging action between the tapered end 107 of the screw and the inclined surface 108 of the locking plate will cause plates 18 and 19 to turn in a counter-clockwise direction until the index pin 88 is locked in abutting relation with one or the other of the shoulders 140 and 141 in the index ring 66. When plates 18 and 19 have been turned in this manner, the angle of slope on faces 20 and 22 of plates 17 and 18 is in the same direction, see Fig. 3. Since in the present embodiment of the invention the angle of taper or slope of faces 20 and 22 are equal, face 25 of plate 19 will be inclined at an angle which is equal to twice the angle of slope of faces 20 and 22. Since the angle of slope of the recess 10 is equal to twice the angle of slope of faces 20 and 22 of plates 17 and 18, the recess 10 is parallel to face 21 of plate 17 and perpendicular to the axis of rotation of the spindle 26.

When the plates 18 and 19 and the valve body 1 attached thereto have been rotated 180 degrees in the manner referred to above, the center of the circular recess 10 may not coincide with the center of rotation of the spindle 26. In such case, plates 17, 18 and 19 must be moved bodily as a unit until the center of the recess 10 coincides with the center of rotation of the spindle 26. Before these plates can be moved bodily in this manner, clamp screws 46 must be loosened, after which they may be moved bodily by means of the screw 52. By turning the screw 52 in the proper direction, the fixture M. F. is moved laterally until the center of recess 10 coincides with the center of rotation of the spindle 26. As will be observed by reference to Fig. 3, the plates 17, 18 and 19, when moved by the screw 52, will be off center with reference to the center of rotation of the spindle 26. This off center position of the plates is indicated in full lines in Fig. 3. When the plates 17, 18 and 19 have been properly located in this manner, screws 46 are tightened, see Fig. 5, so that plate 17 is locked in position. Also, after the plates 18 and 19 have been turned to the proper position, the screws 69 are tightened whereby the clamping ring 70 secures plate 18 to plate 17 so that the fixture will not move out of position while the valve seat recess 10 is being machined.

After the valve seat recess 10 has been formed, the screws 69 for clamping ring 100 are loosened whereby it is caused to move upwardly by the springs 147 to such a position that plate 19 is released. When the plate 19 is released, the screw 106 associated with plate 18 is turned partially out of its block 109 so that the locking plate 101 may pass the end of the screw when the plate is turned.

The clamping ring 100 having been released, the plate 19 may be turned on its trunnion 74, 180 degrees until the index pin 88' falls or drops over one or the other of the shoulders 140 or 141 in the index ring 79. When the operator hears the click which results, the plate 19 is turned in the opposite direction until the index pin abuts against one or the other of the shoulders in the index ring 79. The lock screw 106 is then turned inwardly so that it may force plate 19 in a counter-clockwise direction, by reason of the wedging action between the tapered portion 107 of the screw and the inclined face 108 of the locking plate, until the index pin 88' abuts firmly against one or the other of the shoulders in the index ring. In this position the screws 69 are tightened so that the clamping ring 100 locks plate 19 in its adjusted position. When the plate 19 has been turned 180 degrees, the valve body 1 will occupy the position shown in full lines in Fig. 4 of the drawings. In some types of valves, the valve fixture must be shifted after the valve seat recesses have been made parallel in order that the centers of the recesses may be centered on the axis of rotation of the spindle. Therefore, if recess 10' is not centered when parallel to face 21 of plate 17, the fixture must be shifted until the center of the recess coincides with the axis of spindle 26. When so positioned, the annular or circular recess 10' of the valve body is parallel to face 21 of plate 17 and perpendicular to the axis of rotation of the lathe spindle 26, and its center coincides with the center of rotation of the lathe spindle. By rotating the spindle 26 and by properly advancing the lathe tool, the annular recess 10' may be formed.

After each recess is formed, the valve seat ring is turned into place, as shown in Fig. 1.

It is to be noted that by the particular form of construction of the index pins 88 and 88' and the index rings 66 and 79, the plates 18 and 19 may be turned or indexed with unusual accuracy. Since the pins and the index rings are made of hardened tool steel, very little wear can take place between the operating parts to thereby impair the accuracy thereof. The index pins being polyhedral or square in form and since the shoulders formed on the index rings are of relatively large area, the index pins and the rings have large bearing surfaces. These features prolong the life of the indexing elements of the machine fixture M. F. and contribute materially to the accuracy by which the plates may be turned to their respective operating positions.

The method employed for indexing the plates 18 and 19 is also of material value because if the operator follows out his instructions he will turn the plates 180 degrees until he hears the index pins click. This clicking of the indexing pins is a signal whereby he knows that the plates have been turned past the angular position which they should occupy. Knowing this is the case, the operator then turns the plates in the opposite direction until they cannot be turned any farther in that direction. The plates cannot be turned farther in that direction because the index pins engage or abut against the shoulders on the index rings. To further increase the accuracy of indexing, the lock screws 106 and the locking plates 101 are brought into play and by reason of the wedging action between the screws and the locking plates, the plates 17 and 18 may be turned absolutely and positively against the stops in the index rings so that the utmost of precision in the positioning of the plates is assured.

The machine fixture M. F. disclosed in detail in Figs. 4 to 38, inclusive, is adapted for machining relatively small gate valve bodies in which the weight of the valve bodies does not appreciably enter into the accuracy of the work which can be turned out on the fixture. The fixture disclosed in Figs. 5 to 38, inclusive, being of the horizontal type, valve bodies of relatively light weight may be machined thereon without causing any material deflection in the spindle 26 of the lathe. However, if large and heavy valve bodies should be machined thereon, the weight of such bodies may cause such a deflection in the lathe spindle that inaccuracies might appear in the work machined. Also with the horizontal type of lathe it would be difficult to properly locate large and heavy valve bodies. Therefore, in order to take care of the larger sizes of valve bodies, a vertical type of machine fixture M. F. arranged and constructed in accordance with the invention, is provided. The vertical type of fixture is disclosed in detail in Figs. 39 to 79, inclusive.

The particular embodiment of the machine fixture M. F. disclosed in its assembled form in Figs. 39 and 40 comprises taper plates 156 and 157 and a face plate 158 mounted one upon the other like the taper plates 17 and 18 and face plate 19 embodied in the horizontal type of machine fixture M. F. are assembled. Taper plates 156 and 157 have adjacent faces or surfaces 159 and 160, respectively, that are tapered or inclined at an angle. Surface 159 of plate 156 is inclined at an angle $a$ to its bottom face 161 and face 160 of plate 157 is inclined or tapered at an angle $a$ to face 162 thereof. Where the plates 156 and 157 each have faces or surfaces thereon tapered at an angle $a$, the fixture embodying these plates will be adapted to machine valve seat recesses in the gate valve body 1 that are disposed at an angle $2a$ to the axis 12 of the valve body, see Fig. 1.

When the plates 156 and 157 are so positioned that the tapered or inclined surfaces thereof extend in diametrically opposite directions, faces 161 and 162 are parallel to each other.

Face plate 158 is provided with parallel faces 163 and 164 so that when the taper plates 156 and 157 occupy the positions shown in Fig. 40, face 163 of plate 158 is parallel to the bottom face 161 of plate 156. As in the case of the plates 18 and 19 of the machine fixture M. F. disclosed in assembly and in detail in Figs. 2 to 38, inclusive, plates 157 and 158 are turnable one upon the other and also the two plates may be turned as a unit on plate 156.

In order that plate 157 may be secured to the plate 156 to prevent rotative movement between them, a clamping ring 165 is provided. Clamping ring 165 is similar in construction to clamping ring 70 and is yieldingly mounted on springs 166 on plate 156 in the same manner as the clamping ring 70 is yieldingly mounted on plate 17, see Figs. 6 and 7. The clamping ring also is provided with limit stops 167, whereby when the clamping ring 165 is released the springs will cause it to move away from plate 156 the same distance around the periphery thereof. The limit stops 167 each comprise a bolt 168 that extends through the clamping ring and has screw thread engagement with the plate 156. The bolt has an enlarged head disposed in a countersunk hole 170 in the upper face of the clamping ring. This limit stop construction being similar to the limit stop construction illustrated in Fig. 6, it is believed that the detailed construction illustrated in Fig. 6 is sufficient disclosure of the limit stop construction shown in Fig. 39.

The clamping ring 165 has an inwardly extending shoulder 172 that overhangs a circumferential flange 173 formed on the plate 157 adjacent to its bottom face 160. When the clamping ring 165 is secured firmly by means of screws 174, to the plate 156, the clamping action between the overhanging flange 172 and the flange 173 on plate 157 will cause the plate to be clamped firmly in engagement with the plate 156.

In a similar manner, plate 158 may be clamped upon the plate 157 to prevent rotative movement by means of a clamping ring 175. Clamping ring 175 is yieldingly mounted on springs 176 disposed in recesses 177, formed in the underface of the clamping ring, see Fig. 57. Clamping ring 175 is provided also with limit stops 178, similar in construction to the limit stops shown in Fig. 6, whereby the clamping ring may be uniformly elevated at all points along its periphery when screws 179 are released. The screws 179 are provided for clamping or securing the ring 175 to plate 157. The clamping action between the clamping ring 175 and the plate 158 takes place between an annular flange 181 formed on the clamping ring that overhangs a circumferential flange 182, formed at the periphery of the face plate 158 adjacent to its bottom face 164.

In order to insure that chips or splinters of metal shall not fall between the adjacent surfaces of the clamping ring 165 and the plates 156 and 157 and between the adjacent surfaces of clamping ring 175 and plates 158 and 157, the clamping rings are provided with annular grooves 183 and 184, see Figs. 57 and 60, in which packing 185 may be placed.

In order that the plates 157 and 158 may be indexed to the proper positions so that the annular recesses 10 and 10' in the valve body may be caused to lie parallel with the bottom face 161 of the taper plate 156 and at right angles to the axis of rotation of the fixture, plates 156 and 157 are provided with index rings 186 and 187 and index pins 88 and 88', respectively. The index rings are mounted in grooves 188 and 189 formed in the plates 156 and 157, respectively, see Figs. 43, 44, 48 and 49. The index rings are identical in construction with the index rings 66, illustrated in detail in Figs. 28, 29 and 30 of the drawings.

The index pins 88 and 88' shown in detail in Figs. 18 and 19 of the drawings are mounted or housed in bushings 81, shown in detail in Figs. 20 and 21 of the drawings. These pins 88 and 88' may be yieldingly urged into engagement with the index rings by springs 92.

As shown in Fig. 40 the spring 92, urging pin 88 into engagement with the index ring 86, is disposed between the top of the index pin and the underface of the index ring 187; but the spring 91, urging index pin 88' into engagement with the index ring 87, is disposed between the top of the index pin and a cover plate 121 secured in a countersunk recess formed in the top face 163 of the plate 158.

In order that the plates 157 and 158 may be locked in such positions that the index pins 88 and 88' shall abut firmly against the shoulders or stops formed in the index rings, plates 157 and 158 are provided with locking plates 101, shown in detail in Figs. 12 and 13 of the drawings. The locking plates 101 for the taper plates 157 are mounted in recesses 190 (see Figs. 48 and 50), disposed at the periphery of the plate and adjacent to its underface 160. In the present embodiment of the invention the recesses 190 are located 180 degrees apart, as shown in Fig. 48.

A lock screw 106, shown in detail in Figs. 8 and 9 of the drawings, cooperates with lock plate 101 to lock said plate in one or the other of its indexed positions. The lock screw 106 is disposed in and has screw thread engagement with a block 109 which is secured to plate 156 in the same manner as the block 109 is secured to the plate 17 as illustrated in Fig. 7 of the drawings. As in the construction shown in Fig. 7, the lock screw 106 and the plate 101 embodied in the assembled fixture of Figs. 39 and 40 cause a wedging action to take place which forces the index pin 88 in plate 157 against one or the other of the index shoulders or stops formed in the index ring 186, so that thereby the plate 157 may be located with precision in its indexed positions.

To provide for accurately indexing the plate 158, a lock screw 106, extending through a block 109 and having screw thread engagement therewith, is provided. The block 109 is secured to the plate 157 and cooperates with the lock plate 101 to produce or cause a wedging action sufficient to turn the plate 158 in such a direction that the index pin 88' will abut snugly and positively against the index shoulders formed in the index ring 187.

The clamping rings, shown in Figs. 56, 57, 59 and 60, are provided with recesses 194 and 195, respectively, to accommodate the blocks 109 mounted on the plates 156 and 157. The relative positions of the blocks with respect to the clamping rings is that illustrated in Fig. 10 of the drawings.

The details of construction embodied in the assembled fixture M. F. disclosed in Figs. 39 and 40 will now be taken up in detail.

Plate 156, illustrated in Figs. 43 to 47, inclusive, may be cast of steel or other suitable material and in the casting operation the plate may be cored or hollowed out as indicated at e and provided with radial ribs 191 for strengthening and stiffening the plate. Face 159 of the plate is machined so as to provide a sloping or inclined surface. The angle of slope of face 159 with respect to face 161 thereof is equal to angle a or one-half the angle at which the valve seat recesses 10 and 10' of the valve body 1 are disposed with respect to the axis 12 thereof. As shown in Figs. 43 and 46, the face 159 of the plate is provided with depressed sections 193 disposed at diametrically opposite sides thereof. These sections are provided with elongated slots 194 for the reception of bolts 195 employed to secure the plate to a rotatable table or support, such as the table of a Bullard vertical turret lathe. The plate may, therefore, be moved longitudinally of its diameter 196 so that it may be adjustably positioned on the rotatable table or support.

Face 159 of the plate has a groove 188 in which the index ring 186 is mounted. An opening or aperture 197 may be formed at the center of the plate for the reception of a body member 198, illustrated in detail in Figs. 67 and 68. Concentric with the aperture 197 a relatively shallow recess 199 may be formed for accommodating the flange of the body member 198. The body member 198 may be secured in position in the aperture 197 by means of screws 200.

The body member 198 is provided with depending lugs 201 that are spaced a sufficient distance to accommodate a wedge 202 employed for lifting or raising plates 157 and 158 away from face 159 of plate 156. By raising the plates in this manner friction between the contacting surfaces of plates 156 and 157 is avoided when it is necessary to turn the plates through predetermined angles. The wedge 202 is slidably disposed upon a wedge bearing plate 203 secured to the depending lugs 201.

In order that the plates 157 and 158 may be elevated or lifted off plate 156 when the wedge 202 is moved to the right as viewed from Fig. 40, a wedge plug 204 is provided. The wedge plug 204 embodies a trunnion portion 205 having a circumferential shoulder 206 at its base for the reception of an anti-friction bearing 207. Immediately below the circumferential shoulder 206 a circumferential shoulder 208 is formed. The distance between the shoulders 206 and 208 is such that the wedge plug may be elevated through an aperture 209 in the body 198 when the wedge 202 enters between face 210 of the bearing plate 203 and an inclined or sloping face 211 formed between depending lugs 212 of the wedge plug.

The wedge 202 may be moved in and out by means of a rod 213 that has screw thread engagement with a shank 214 of the wedge. The rod 213 extends through an opening 215 formed in the margin of the plate 156 (see Figs. 43 and 47). Opening 215 terminates in a countersunk recess 216 for accommodating a nut 217 secured to the shaft or rod 213. The nut 217 has a countersunk polyhedral opening 218 for the reception of a tool for turning the shaft or rod 213. To give access of the tool to the polyhedral opening 218, clamping ring 165 is grooved at 213' (see Figs. 40 and 59).

Longitudinal movement of the rod 213 with respect to the plate 156 is prevented by means of a collar 219 secured to the shaft or rod 213. The collar 219 cooperates with the head or nut 217 and a portion 220 of the plate (see Fig. 47) to prevent such longitudinal movement of the rod or shaft. When the shaft 213 is turned in such a direction as to advance the threaded portion 222 thereof into the shank 214 of the wedge, the wedge is moved to the left as viewed from Figs. 40 and 40a; but if the shaft 213 is turned in the opposite direction, so that the threaded portion 222 is withdrawn or turned out of the threaded shank 214, the wedge 20 is moved to the right as viewed from Figs. 40 and 40a causing the plates 157 and 158 to be elevated. The plates are elevated by reason of the upward movement of the wedge plug 204 which when moved upwardly causes the anti-friction bearing 207 to bear against a bearing plate 223 secured to body member 198'. Body member 198' is secured to plate 157 in the same manner as the body member 198 is secured to plate 156.

As shown in Figs. 40 and 40a, the anti-friction bearing 207 engages the bottom surface of the bearing plate 223 so that the vertical thrust of the wedge plug 204 is transmitted to plate 223 by the bearing carried on the annular shoulder 206 of the plug.

In order that the wedge plug 204 may have ample bearing area to resist the lateral thrust of the wedge 202, a segmental plate 225 is secured to body member 198 in such a position that it bears against the cylindrical portion of the wedge plug adjacent the annular shoulders 208 thereof.

Plate 157 is shown in detail in Figs. 48 to 51, inclusive, and may be made of cast steel or other suitable metal. In order to lighten the plate, the tapered face 160 thereof may be cored or hollowed out as at $d$. The plate may be strengthened by radial ribs $f$.

An aperture or opening 226 is formed at the center of plate 156 for the reception of the body member 198. The flange of the body member is disposed in a recess 227 formed in the face 162 of the plate and concentrically with the aperture 226. The body member is secured in place by the screws 200 (see Fig. 40).

As shown in Figs. 49 and 40, the plate 157 is held in a fixed position with respect to plate 156 by means of a recess 228 formed in face 160 of plate 157 that registers with the flange portion of the body member 198 secured to plate 156.

In order that the plate 158 may be turned easily, a wedge plug 204, shown in detail in Figs. 70, 71 and 72, and a wedge 202 are provided. The wedge plug is supported on a bearing plate 228 (see Figs. 63 and 64) secured to depending lugs 201 of the body member. The wedge 202 has sliding engagement with faces 229 and 211 of the plate 223 and the wedge plug, respectively. When the wedge 202 is forced inwardly between faces 229 and 211, the wedge plug 204 is raised whereby the plate 158 is elevated and supported on the anti-friction bearing 207 carried by the trunnion portion 205 of the wedge plug. Since plate 158 when elevated is supported on the anti-friction bearing it may be turned easily to one or another of its operating positions.

As shown in Figs. 48 and 49, plate 157 is provided with a bored opening 230 and a recess 231 for accommodating the bushing for index pin 88 (see details in Figs. 18, 19, 20 and 21). When the bushing, index pin, and index ring 187 are mounted in place, as shown in Fig. 40, the pin is yieldingly urged by spring 92 into engagement with the index ring.

The face plate 158 is illustrated in detail in Figs. 52, 53, 54 and 55, and is similar in construction to plate 19 of the machine fixture M. F. shown in the assembled views of Figs. 5 and 16. Plate 158 may be cast of steel or other suitable metal and cored or hollowed out on its bottom face 164 as indicated at $g$. The plate may be stiffened and strengthened by radial ribs $h$.

The top face 163 of plate 158 is machined parallel to the bottom face 164 in the same manner as the opposite faces of plate 19 are made parallel. As shown in Figs. 53 and 54, the face 163 of plate 158 is provided with T-slots 232 for the reception of the heads of bolts 233 having clamps 234, whereby valve bodies to be machined may be secured in place. The clamps may be mounted at different elevations on washers or spacers 235 according to the sizes of the valve bodies and the thickness of their flanges.

Plate 158 is also provided with a groove 236 in which a gauge plate 237 may be secured at different distances from the center of the plate, according to the size of valve body to be machined by means of a cap screw 238. The gauge carries an L-shape member 239 which serves as a means for determining whether or not the valve bodies are in proper alinement vertically. The plate is also provided with a bored opening 240 and enlarged recess 241 for the reception of the bushing 81' and index pin 88'.

As shown in Fig. 40a, the face plate 158 is centrally located with respect to the plate 157 by means of the annular recess 240' formed in the face 164 which recess registers with the flanged portion of the body member 198' attached to plate 157.

In order that the wedge plugs, wedges and bearing plates may be properly lubricated, a drilled hole or passageway 241' is provided through the several parts as shown in Fig. 40a. The entrance to the passageway 241' may be closed by a suitable closure member (not shown) which may be screwed into the tapped hole 243 in the face plate 158. So that the lubricant may be distributed evenly over the opposite faces of the wedge 202, lubricant conveying grooves 243 are provided in the opposite faces of the wedge (see Figs. 75 and 76). These lubricant conveying grooves communicate with the passageway 241' and cause lubricant to flow over substantially the entire surface of the wedges. In order that the shafts 213 which operate the wedges 202 may be lubricated at the points where the threaded portions 22 of the shafts engage the threaded shanks 214, the plates 156, 157 and 158, wedges 202 are provided with passageways 244, 245 and 245', respectively, whereby lubricant may be conveyed from the face 163 of the face plate 158 to the point where the shafts 213 have screw thread engagement with the wedges. The passages 244 and 245 may be closed by means of suitable closure members that may be screwed into tapped holes 246 and 247 formed in the face 163 of the face plate 158.

In the operation of the machine fixture disclosed in the assembled views of Figs. 39 and 40, the fixture is mounted on the rotatable table of a Bullard vertical turret lathe. Since such lathes are well known in the art, the rotatable tables of such machines have not been illustrated. It is sufficient to say, however, that such tables correspond in function to the plate 39 which is attached to the spindle 26 of the horizontal type lathe (see Fig. 17). The rotatable tables of Bullard machines are provided with dovetail grooves that extend diametrically across the face of the table.

In order that the fixture shown in Figs. 39 and 40 may be mounted and secured in such dovetail grooves in different positions to which it may be adjusted, the plate 156 is provided with guide keys 247 secured to the face 161 of the plate, a holding key 248 and locking blocks 249. The guide keys 247 are disposed to register in the dovetail grooves of the Bullard table so as to guide the fixture as it is moved longitudinally along such grooves; the blocks 249 cooperate with screws 195 to clamp or lock the fixture in any position to which the fixture may be adjusted; and the holding key 248 is provided to maintain the guide key 247 in proper position and alinement.

When a valve body is placed on face 163 of face plate 158 and clamped in position thereon, the plates will occupy the position shown in Fig. 40 of the drawings in which position the face 163 is parallel to the face 161 of the plate 156 and also parallel to the face of the Bullard table to which the fixture is secured. When in this position the flanges of the valve body and the ribs which guide the valve plug may be machined. When the flanges and the guide ribs have been machined, the lock screw 105 carried by plate 156 is turned so that its tapered end is out of engagement with the lock plate 101. The screws 173 are then loosened so as to release the clamp ring 165 from the annular flange 173 of the plate 157. Screw 213 carried by plate 156 is then turned so as to advance the wedge 202 to the right as viewed from Fig. 40 whereby the wedge 202 is elevated to such a position that the weight of plates 157 and 158 is carried on the anti-friction bearing 207. Plates 157 and 158 may then be turned 180 degrees on this bearing so that the tapered faces 159 and 160 of plates 156 and 157 will be sloping in the same direction. When in this position the screw 213 is turned so as to withdraw the wedge 202 to the position indicated in Fig. 40. In this position the weight of the plates 157 and 158 will be carried by the plate 156.

In order to lock the plates 157 and 158 in the position referred to above, the screw 106 is advanced into the block 109 until its tapered end cooperates with the inclined surface on the locking plate 101 located directly under the block 109 carried by plate 157 as viewed from Fig. 39. By advancing the screw 106 into the block 109, the plates 157 and 158 will be turned in such a direction that the index pin 88 will abut against one or the other of the stops or shoulders in the index ring 186. These stops or shoulders correspond to the stops or shoulders 140 and 141 of the index-ring shown in Figs. 28, 29 and 30. When the plates 157 and 158 have been so locked, the screws 173 are tightened so as to force the clamp ring downwardly and thereby clamp or secure the plate 157 to the plate 156.

When the plates 157 and 158 have been turned in the manner set forth above, one of the valve seat recesses is parallel to face 161 of plate 156 and perpendicular to the axis of rotation of the machine spindle. The recess may now be machined and the valve seat ring screwed into place.

To place the other recess into parallelism with face 161 of plate 156, the face plate 158 is turned 180 degrees. Before the plate can be turned, lock screw 106 carried by plate 157 is backed out of block 109 so that the end of the screw may pass the outermost surface of lock plate 101 carried by plate 158. The next step is to release the clamping ring 175 so that the plate will be free to turn when supported on its associated antifriction bearing 207.

After releasing the clamping ring 175, the wedge 202 associated with plate 158, is advanced so that this plate is elevated or raised off plate 157 and supported on the antifriction bearing. Plate 158 may now be turned 180 degrees to a position in which the other valve seat recess will be parallel to face 161 of plate 156. When in this position, the wedge is withdrawn lowering plate 158 on plate 157. The lock screw 106 may now be turned into block 109 until the necessary wedging action between the screw and lock plate 101 has forced the index pin 88′ positively into engagement with the indexing shoulder on index ring 187. This having been done, the clamping ring may be forced down upon plate 158 so as to lock it in this position.

The method of making taper plates

In order that such objects as valve bodies may be machined with accuracy and precision on a quantity basis, it becomes necessary to have several, if not large numbers of machines in operation. If each and every machine is to turn out or produce work of the same degree of accuracy and precision, each machine must be provided with instrumentalities or tools, that are identical in the matter of accuracy and precision.

Therefore, in order that a number of machine fixtures like the one illustrated in Figs. 5 and 16, or in Figs. 39 and 40, may be constructed each one identical to another, the taper plates must be constructed by the same method and from the same base or pattern.

In the manufacture of the taper plates, a master taper plate is first made, and the taper of such a plate is determined by the angle at which the valve seat recesses are disposed. This plate is made carefully, accurately and with the utmost precision.

From the master plate, as pattern or base, the other taper plates are made, the angle of taper being made to correspond to the angle of taper of the master. It is, therefore, apparent that any number of taper plates may be made; using the master plate as a pattern and each plate made in accordance with it will be identical. Therefore, all taper plates will be alike.

The blank from which the taper plates are made, also the master plate, are first cast in the rough, machined approximately to size, annealed and aged for a period of say six months so that all warpage of the plates will have ceased. The plates may then be finished and put in use.

After a machine fixture has been in service for some time, the taper plates may wear more in some places than in others, thereby causing inaccuracy in the work. If such is the case, the fixture may be dismantled and the plates refinished on the master plate in order to restore them to their original accuracy. This feature of the invention is very important in that the precision of the fixtures may be retained until the plates are too thin to be of any further use, and at a comparatively low cost.

While the invention has been illustrated in the embodiment of two types of machine fixtures, it is to be understood that various modifications and changes may be made in these types without departing from the spirit and the scope of the invention. Therefore, it is desired that only such limitations shall be placed on the invention as are imposed by the prior art and the appended claims.

What we claim as new and desire to secure by Letters Patent is:

1. In combination, two plates mounted upon each other and having their adjacent faces inclined or tapered at an angle to their respective opposite faces, an annular ring disposed in a groove formed in the inclined or sloping face of one of said plates, said ring having on its upper face stops or shoulders substantially rectangular in form and spaced 180 degree apart and lying along a line connecting the points of maximum and minimum taper thickness of the plate on which said ring is mounted, the other of said plates having an index pin yieldingly mounted thereon and having its free end engaging the upper face of the index ring, said pin being polyhedral in form and so positioned that one of its flat faces lies along a line connecting the points of maximum and minimum taper thickness of the plate on which it is mounted and in position to lie flush against the one or the other of said stops when the plates occupy predetermined positions with respect to each other, whereby when the pin engages one of said stops the inclined faces of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates.

2. In combination, two plates mounted upon each other and having their adjacent faces inclined or tapered at an angle to their respective opposite faces, an annular ring disposed in a groove formed in the inclined or sloping face of one of said plates, said ring having on its upper face stops or shoulders substantially rectangular in form and spaced 180 degrees apart and lying along a line connecting the points of maximum and minimum taper thickness of the plate on which said ring is mounted, the other of said plates having an index pin yieldingly mounted thereon and having its free end engaging the upper face of the index ring, said pin being polyhedral in form and so positioned that one of its flat faces lies along a line connecting the points of maximum and minimum taper thickness of the plate on which it is mounted and in position to lie flush against the one or the other of said stops when the plates occupy predetermined positions with respect to each other, whereby when the pin engages one of said stops the inclined face of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates, and means for rotatably mounting an object or body upon the plate having the index pin thereon.

3. A fixture adapted for mounting on a rotating body, table, shaft and the like, and upon which fixture an article to be machined may be secured, said fixture comprising a plurality of plates adjacent faces of which are tapered or inclined at an angle, a plate having parallel faces mounted on one of said plates, anti-friction bearings interposed between adjacent faces of said plates, and means for selectively mounting said plates on said bearings.

4. A fixture adapted for mounting on a rotating body, table, shaft and the like, and upon which fixture an article to be machined may be secured, said fixture comprising a plurality of plates adjacent faces of which are tapered or inclined at an angle, a plate having parallel faces mounted on one of said plates, retractible anti-friction bearings interposed between said plates, said bearings when extended supporting the plates thereon and when retracted, said plates rest one upon another, and means for retracting and extending said bearings at will.

5. A rotatable taper plate for a machine fixture having one face thereof formed at an angle to the axis of rotation, and an index ring mounted in said plate, said ring having cam surfaces running from the surface thereof downwardly to a point below the same and terminating in flat abutment surfaces disposed perpendicularly to the surface of the ring and adapted to be engaged by one side of a polyhedral index pin.

6. A rotatable taper plate for a machine fixture having one face thereof perpendicular to the axis of rotation and the opposite face inclined at an angle thereto, an index ring mounted in said plate and concentric with said axis of rotation, said index ring having cam surfaces terminating in detents or stops located at predetermined points along the periphery thereof.

7. In combination with a support mounted for rotation, of a plurality of turnable plates mounted consecutively on said support, certain of said plates having adjacent surfaces tapered at an angle to the axis of rotation of said support and at least one of said plates having opposite faces thereof parallel and disposed at right angles to the axis of rotation of said support, means for clamping said plates to each other and to said support, means on one plate including a pin which is immovable in the direction of rotation of said plate and angularly positioned abutments on another of said plates for indexing at least one of said plates having a tapered face and the plate having parallel faces, through predetermined angles, whereby the plate having the parallel faces may be tilted so that its parallel faces are inclined at an angle to the axis of rotation of the support greater than the angle of the adjacent tapered faces of said certain plates and means for locking said pin in positive engagement with one of the abutments to hold the plates in their indexed positions.

8. In combination, two plates turnably mounted one upon the other, one of said plates having a circumferential flange, of a clamping member having a flange overhanging the circumferential flange of said plate, springs interposed between the other of said plates and the clamping ring yieldingly urging said ring out of clamping position, means for securing said ring to said other plate whereby clamping action may take place between the overhanging flange of said ring and the circumferential flange of the plate to clamp said plate together, and means associated with said ring for limiting the movement thereof by said springs when released from said securing means.

9. A fixture adapted for mounting on a rotating body, table, shaft and the like, and upon which fixture an article to be machined may be secured, said fixture comprising a plurality of plates adjacent faces of which are tapered or inclined at an angle, a plate having parallel faces mounted on one of said plates, means on said parallel faced plate for attaching a body thereon to be machined, and means for adjustably and bodily shifting said fixture laterally with respect to said rotating body, table, shaft and the like.

10. In combination, two plates mounted upon each other and having their adjacent faces inclined or tapered at an angle to their respective opposite faces, an annular ring disposed in a groove formed in the inclined or sloping face of one of said plates, said ring having on its upper face stops or shoulders substantially rectangular in form and spaced 180 degrees apart, the other of said plates having an index pin mounted thereon and having its free end engaging the upper face of the index ring, said pin being polyhedral in form and so positioned that one of its flat faces will lie flush against the one or the other of said stops when the plates occupy predetermined positions with respect to each other, whereby when the pin engages one of said stops the inclined faces of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates.

11. In combination, two plates mounted upon each other and having their adjacent faces inclined or tapered at an angle to their respective opposite faces, an annular ring disposed in a groove formed in the inclined or sloping face of one of said plates, said ring having on its upper face stops or shoulders substantially rectangular in form and spaced 180 degrees apart, the other of said plates having an index pin mounted thereon and having its free end engaging the upper face of the index ring, said pin having a flat side arranged to lie flush against the one or the other of said stops when the plates occupy predetermined positions with respect to each other, whereby when the pin engages one of said stops the inclined faces of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates.

12. In combination, two plates mounted upon each other and having their adjacent faces inclined or tapered at an angle to their respective opposite faces, an annular ring disposed in a groove formed in the inclined or sloping face of one of said plates, said ring having on its upper face circumferentially spaced stops or shoulders substantially rectangular in form, the other of said plates having an index pin mounted thereon and having its free end engaging the upper face of the index ring, said pin being polyhedral in form and so positioned that one of its flat faces will lie flush against the one or the other of said stops when the plates occupy predetermined positions with respect to each other, whereby when the pin engages one of said stops the inclined faces of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates.

13. In combination, two plates mounted upon each other and having their adjacent faces inclined or tapered at an angle to their respective opposite faces, an annular ring disposed in a groove formed in the inclined or sloping face of one of said plates, said ring having on its upper face circumferentially spaced stops or shoulders substantially rectangular in form, the other of said plates having an index pin mounted thereon and having its free end engaging the upper face of the index ring, said pin having a flat side arranged to lie flush against the one or the other of said stops when the plates occupy predetermined positions with respect to each other, whereby when the pin engages one of said stops the inclined faces of said plates slope in diametrically opposite directions and the opposite faces of said plates are parallel to each other, and whereby when said pin engages the other of said stops or shoulders the inclined faces of said plates slope in the same direction and the opposite faces of said plates are inclined at an angle to each other, said angle being twice the angle of slope of the tapered faces of said plates.

JOHN P. MELCHER.
WILLIAM D. CAPPE.